(12) United States Patent
Eatedali et al.

(10) Patent No.: US 11,413,536 B2
(45) Date of Patent: *Aug. 16, 2022

(54) SYSTEMS AND METHODS FOR MANAGING VIRTUAL ITEMS ACROSS MULTIPLE VIDEO GAME ENVIRONMENTS

(71) Applicant: Activision Publishing, Inc., Santa Monica, CA (US)

(72) Inventors: Josiah Eatedali, Los Angeles, CA (US); Robert Schonfeld, Sherman Oaks, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/889,321

(22) Filed: Jun. 1, 2020

(65) Prior Publication Data
US 2020/0360815 A1    Nov. 19, 2020

Related U.S. Application Data

(63) Continuation of application No. 15/953,934, filed on Apr. 16, 2018, now Pat. No. 10,765,948.
(Continued)

(51) Int. Cl.
*A63F 13/58* (2014.01)
*A63F 13/69* (2014.01)
(Continued)

(52) U.S. Cl.
CPC .............. *A63F 13/58* (2014.09); *A63F 13/35* (2014.09); *A63F 13/69* (2014.09); *A63F 13/798* (2014.09)

(58) Field of Classification Search
CPC ........ A63F 13/35; A63F 13/58; A63F 13/798; A63F 13/69; A63F 2300/575
See application file for complete search history.

(56) References Cited

U.S. PATENT DOCUMENTS

| | | |
|---|---|---|
| 4,461,301 A | 7/1984 | Ochs |
| 4,908,761 A | 3/1990 | Tai |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Plouznikoff, Alexandre, et al., Enhancing Human-Machine Interactions: Virtual Interface Alteration Through Wearable Computers, CHI 2006 Proceedings, Interaction Methods, Apr. 22-27, 2006, Montreal, Quebec, Canada.

(Continued)

*Primary Examiner* — James S. McClellan
*Assistant Examiner* — Ross A Williams
(74) *Attorney, Agent, or Firm* — Novel IP

(57) ABSTRACT

The present specification describes a system and method for aggregating user results, rankings and statistical data associated with playing video games across two or more games, normalizing the aggregated data to unified values and presenting the aggregated and unified data via an interface, such that data from one game may be fairly combined and/or compared to data from another game. The present system enables users of one game to trade game-related virtual items with users of another game by providing a normalized score or value for virtual items, thereby permitting virtual items associated with one game to be fairly compared against virtual items of another game.

20 Claims, 10 Drawing Sheets

Related U.S. Application Data

(60) Provisional application No. 62/610,021, filed on Dec. 22, 2017.

(51) Int. Cl.
*A63F 13/35* (2014.01)
*A63F 13/798* (2014.01)

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,442,780 A | 8/1995 | Takanashi |
| 5,493,692 A | 2/1996 | Theimer |
| 5,497,186 A | 3/1996 | Kawasaki |
| 5,506,902 A | 4/1996 | Kubota |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,734,898 A | 3/1998 | He |
| 5,736,985 A | 4/1998 | Lection |
| 5,736,990 A | 4/1998 | Barrus |
| 5,737,416 A | 4/1998 | Cooper |
| 5,737,533 A | 4/1998 | De |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,094 A | 11/1998 | Ermel |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,933,849 A | 8/1999 | Srbljic |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,034 A | 12/1999 | Heath |
| 6,006,223 A | 12/1999 | Agrawal |
| 6,008,848 A | 12/1999 | Tiwari |
| 6,009,455 A | 12/1999 | Doyle |
| 6,009,458 A | 12/1999 | Hawkins |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,098,093 A | 8/2000 | Bayeh |
| 6,101,538 A | 8/2000 | Brown |
| 6,104,406 A | 8/2000 | Berry |
| 6,105,008 A | 8/2000 | Davis |
| 6,108,420 A | 8/2000 | Larose |
| 6,111,581 A | 8/2000 | Berry |
| 6,115,718 A | 9/2000 | Huberman |
| 6,119,229 A | 9/2000 | Martinez |
| 6,134,588 A | 10/2000 | Guenthner |
| 6,135,646 A | 10/2000 | Kahn |
| 6,138,128 A | 10/2000 | Perkowitz |
| 6,138,152 A | 10/2000 | Jalote |
| 6,141,699 A | 10/2000 | Luzzi |
| 6,144,381 A | 11/2000 | Lection |
| 6,148,294 A | 11/2000 | Beyda |
| 6,148,299 A | 11/2000 | Yoshimoto |
| 6,148,328 A | 11/2000 | Cuomo |
| 6,154,811 A | 11/2000 | Srbljic |
| 6,157,953 A | 12/2000 | Chang |
| 6,170,013 B1 | 1/2001 | Murata |
| 6,177,932 B1 | 1/2001 | Galdes |
| 6,179,713 B1 | 1/2001 | James |
| 6,182,067 B1 | 1/2001 | Presnell |
| 6,182,077 B1 | 1/2001 | Tokumine |
| 6,185,614 B1 | 2/2001 | Cuomo |
| 6,195,657 B1 | 2/2001 | Rucker |
| 6,199,059 B1 | 3/2001 | Dahan |
| 6,199,067 B1 | 3/2001 | Geller |
| 6,201,881 B1 | 3/2001 | Masuda |
| 6,205,481 B1 | 3/2001 | Heddaya |
| 6,212,494 B1 | 4/2001 | Boguraev |
| 6,212,548 B1 | 4/2001 | Desimone |
| 6,216,098 B1 | 4/2001 | Clancey |
| 6,219,675 B1 | 4/2001 | Pal |
| 6,219,676 B1 | 4/2001 | Reiner |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,270,416 B1 | 8/2001 | Komoto |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,292,835 B1 | 9/2001 | Huang |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,321,236 B1 | 11/2001 | Zollinger |
| 6,330,281 B1 | 12/2001 | Mann |
| 6,334,127 B1 | 12/2001 | Bieganski |
| 6,334,141 B1 | 12/2001 | Varma |

(56) References Cited

U.S. PATENT DOCUMENTS

| | | |
|---|---|---|
| 6,336,134 B1 | 1/2002 | Varma |
| 6,337,700 B1 | 1/2002 | Kinoe |
| 6,343,738 B1 | 2/2002 | Ogilvie |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,366,285 B1 | 4/2002 | Brush |
| 6,370,560 B1 | 4/2002 | Robertazzi |
| 6,396,513 B1 | 5/2002 | Helfman |
| 6,397,080 B1 | 5/2002 | Viktorsson |
| 6,404,426 B1 | 6/2002 | Weaver |
| 6,411,312 B1 | 6/2002 | Sheppard |
| 6,418,424 B1 | 7/2002 | Hoffberg |
| 6,418,462 B1 | 7/2002 | Xu |
| 6,421,047 B1 | 7/2002 | De |
| 6,426,757 B1 | 7/2002 | Smith |
| 6,445,389 B1 | 9/2002 | Bossen |
| 6,449,518 B1 | 9/2002 | Yokoo |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,591,250 B1 | 7/2003 | Johnson |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,694,306 B1 | 2/2004 | Nishizawa |
| 6,717,600 B2 | 4/2004 | Dutta |
| 6,734,884 B1 | 5/2004 | Berry |
| 6,742,032 B1 | 5/2004 | Castellani |
| 6,745,236 B1 | 6/2004 | Hawkins |
| 6,765,596 B2 | 7/2004 | Lection |
| 6,781,607 B1 | 8/2004 | Benham |
| 6,798,407 B1 | 9/2004 | Benman |
| 6,801,930 B1 | 10/2004 | Dionne |
| 6,807,562 B1 | 10/2004 | Pennock |
| 6,810,418 B1 | 10/2004 | Shah |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| 6,954,728 B1 | 10/2005 | Kusumoto |
| 6,954,906 B1 | 10/2005 | Kamachi |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,083 B2 | 8/2006 | Yokoo |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,249,139 B2 | 7/2007 | Chuah |
| 7,250,944 B2 | 7/2007 | Anderson |
| 7,251,622 B2 | 7/2007 | Yan |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,512,548 B1 | 3/2009 | Bezos |
| 7,515,136 B1 | 4/2009 | Kanevsky |
| 7,517,282 B1 | 4/2009 | Pryor |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,593,864 B2 | 9/2009 | Shuster |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,657,340 B2 | 2/2010 | Lind |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |
| 7,713,116 B2 | 5/2010 | Keam |
| 7,714,867 B2 | 5/2010 | Doi |
| 7,719,532 B2 | 5/2010 | Schardt |

(56) References Cited

U.S. PATENT DOCUMENTS

| | | |
|---|---|---|
| 7,719,535 B2 | 5/2010 | Tadokoro |
| 7,729,951 B2 | 6/2010 | Dawson |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,780,532 B2 | 8/2010 | Van |
| 7,782,318 B2 | 8/2010 | Shearer |
| 7,792,263 B2 | 9/2010 | D Amora |
| 7,792,801 B2 | 9/2010 | Hamilton, II |
| 7,792,808 B2 | 9/2010 | Stuart |
| 7,796,128 B2 | 9/2010 | Radzikowski |
| 7,797,168 B2 | 9/2010 | Kusumoto |
| 7,801,228 B2 | 9/2010 | Lehne |
| 7,805,680 B2 | 9/2010 | Meyers |
| 7,808,500 B2 | 10/2010 | Shearer |
| 7,814,152 B2 | 10/2010 | McGowan |
| 7,824,253 B2 | 11/2010 | Thompson |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,958,047 B2 | 6/2011 | Jung |
| 7,958,055 B2 | 6/2011 | Hsu |
| 7,962,751 B2 | 6/2011 | Dudley |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |
| 7,996,264 B2 | 8/2011 | Kusumoto |
| 7,997,987 B2 | 8/2011 | Johnson |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,313,364 B2 | 11/2012 | Reynolds |
| 8,334,871 B2 | 12/2012 | Hamilton, II |
| 8,360,886 B2 | 1/2013 | Karstens |
| 8,364,804 B2 | 1/2013 | Childress |
| 8,370,370 B2 | 2/2013 | Huang |
| 8,425,326 B2 | 4/2013 | Chudley |
| 8,442,946 B2 | 5/2013 | Hamilton, II |
| 8,489,925 B1 | 7/2013 | Antukh |
| 8,496,531 B2 | 7/2013 | Youm |
| 8,506,372 B2 | 8/2013 | Chudley |

(56) References Cited

U.S. PATENT DOCUMENTS

| | | |
|---|---|---|
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,696,465 B2 | 4/2014 | Gatto |
| 8,721,412 B2 | 5/2014 | Chudley |
| 8,777,754 B1 | 7/2014 | Santini |
| 8,827,816 B2 | 9/2014 | Bhogal |
| 8,838,640 B2 | 9/2014 | Bates |
| 8,849,917 B2 | 9/2014 | Dawson |
| 8,888,598 B2 | 11/2014 | Mehta |
| 8,911,296 B2 | 12/2014 | Chudley |
| 8,924,308 B1 | 12/2014 | Mehta |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,508,222 B1 | 11/2016 | Mclellan |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,795,887 B2 | 10/2017 | Lin |
| 9,808,722 B2 | 11/2017 | Kawachiya |
| 9,827,488 B2 | 11/2017 | Pearce |
| 9,942,013 B2 | 4/2018 | Malladi |
| 10,118,099 B2 | 11/2018 | Condrey |
| 10,386,988 B1 | 8/2019 | Koh |
| 10,402,731 B1 | 9/2019 | Cosic |
| 10,981,069 B2 * | 4/2021 | Kawachiya ............. A63F 13/75 |
| 2001/0007979 A1 | 7/2001 | Teshima |
| 2001/0025253 A1 | 9/2001 | Heintz |
| 2001/0032240 A1 | 10/2001 | Malone |
| 2001/0049301 A1 | 12/2001 | Masuda |
| 2001/0049651 A1 | 12/2001 | Selleck |
| 2001/0056383 A1 | 12/2001 | Shuster |
| 2002/0002514 A1 | 1/2002 | Kamachi |
| 2002/0007319 A1 | 1/2002 | Yu |
| 2002/0026388 A1 | 2/2002 | Roebuck |
| 2002/0035480 A1 | 3/2002 | Gordon |
| 2002/0035593 A1 | 3/2002 | Salim |
| 2002/0043568 A1 | 4/2002 | Hess |
| 2002/0065870 A1 | 5/2002 | Baehr-Jones |
| 2002/0073043 A1 | 6/2002 | Herman |
| 2002/0090995 A1 | 7/2002 | Haga |
| 2002/0095387 A1 | 7/2002 | Sosa |
| 2002/0095586 A1 | 7/2002 | Doyle |
| 2002/0096831 A1 | 7/2002 | Nakayama |
| 2002/0097856 A1 | 7/2002 | Wullert |
| 2002/0105533 A1 | 8/2002 | Cristo |
| 2002/0116466 A1 | 8/2002 | Trevithick |
| 2002/0124137 A1 | 9/2002 | Ulrich |
| 2002/0125312 A1 | 9/2002 | Ogilvie |
| 2002/0130904 A1 | 9/2002 | Becker |
| 2002/0135618 A1 | 9/2002 | Maes |
| 2002/0169644 A1 | 11/2002 | Greene |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0004774 A1 | 1/2003 | Greene |
| 2003/0008712 A1 | 1/2003 | Poulin |
| 2003/0014297 A1 | 1/2003 | Kaufman |
| 2003/0014423 A1 | 1/2003 | Chuah |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135433 A1 | 7/2003 | Yan |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0158827 A1 | 8/2003 | Ansari |
| 2003/0164827 A1 | 9/2003 | Gottesman |
| 2003/0177187 A1 | 9/2003 | Levine |
| 2003/0195957 A1 | 10/2003 | Banginwar |
| 2003/0210265 A1 | 11/2003 | Haimberg |
| 2004/0001616 A1 | 1/2004 | Gutta |
| 2004/0014514 A1 | 1/2004 | Yacenda |
| 2004/0030888 A1 | 2/2004 | Roh |
| 2004/0053690 A1 | 3/2004 | Fogel |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0107125 A1 | 6/2004 | Guheen |
| 2004/0110552 A1 | 6/2004 | Del Prado |
| 2004/0113756 A1 | 6/2004 | Mollenkopf |
| 2004/0122553 A1 | 6/2004 | Phan |
| 2004/0127277 A1 | 7/2004 | Walker |
| 2004/0128181 A1 | 7/2004 | Zurko |
| 2004/0143852 A1 | 7/2004 | Meyers |
| 2004/0163133 A1 | 8/2004 | Ueda |
| 2004/0166935 A1 | 8/2004 | Gavin |
| 2004/0167880 A1 | 8/2004 | Smith |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0225387 A1 | 11/2004 | Smith |
| 2004/0228291 A1 | 11/2004 | Huslak |
| 2004/0243664 A1 | 12/2004 | Horstemeyer |
| 2004/0244006 A1 | 12/2004 | Kaufman |
| 2004/0260771 A1 | 12/2004 | Gusler et al. |
| 2004/0266505 A1 | 12/2004 | Keam |
| 2004/0268386 A1 | 12/2004 | Logan |
| 2005/0015571 A1 | 1/2005 | Kaufman |
| 2005/0021472 A1 | 1/2005 | Gettman |
| 2005/0021484 A1 | 1/2005 | Bodin |
| 2005/0027696 A1 | 2/2005 | Swaminathan |
| 2005/0043097 A1 | 2/2005 | March |
| 2005/0050137 A1 | 3/2005 | Bodin |
| 2005/0054381 A1 | 3/2005 | Lee |
| 2005/0060368 A1 | 3/2005 | Wang |
| 2005/0071306 A1 | 3/2005 | Kruszewski |
| 2005/0071428 A1 | 3/2005 | Khakoo |
| 2005/0071462 A1 | 3/2005 | Bodin |
| 2005/0075934 A1 | 4/2005 | Knight |
| 2005/0080859 A1 | 4/2005 | Lake |
| 2005/0085296 A1 | 4/2005 | Gelb |
| 2005/0091380 A1 | 4/2005 | Gonen |
| 2005/0097440 A1 | 5/2005 | Lusk |
| 2005/0102188 A1 | 5/2005 | Hutchison |
| 2005/0113164 A1 | 5/2005 | Buecheler |
| 2005/0132009 A1 | 6/2005 | Solie |
| 2005/0137015 A1 | 6/2005 | Rogers |
| 2005/0138108 A1 | 6/2005 | Galvin |
| 2005/0143174 A1 | 6/2005 | Goldman |
| 2005/0149620 A1 | 7/2005 | Kirkland |
| 2005/0161878 A1 | 7/2005 | Nally |
| 2005/0165893 A1 | 7/2005 | Feinberg |
| 2005/0177428 A1 | 8/2005 | Ganz |
| 2005/0177453 A1 | 8/2005 | Anton |
| 2005/0182729 A1 | 8/2005 | Kananen |
| 2005/0192864 A1 | 9/2005 | Ganz |
| 2005/0216346 A1 | 9/2005 | Kusumoto |
| 2005/0216361 A1 | 9/2005 | Fukada |
| 2005/0223075 A1 | 10/2005 | Swearingen et al. |
| 2005/0240531 A1 | 10/2005 | Wolff |

(56) References Cited

U.S. PATENT DOCUMENTS

| | | |
|---|---|---|
| 2005/0246711 A1 | 11/2005 | Berstis |
| 2005/0251512 A1 | 11/2005 | McCauley |
| 2005/0253840 A1 | 11/2005 | Kwon |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0028475 A1 | 2/2006 | Tobias |
| 2006/0031128 A1 | 2/2006 | Lamitie |
| 2006/0031322 A1 | 2/2006 | Kessen |
| 2006/0031326 A1 | 2/2006 | Ovenden |
| 2006/0036688 A1 | 2/2006 | McMahan |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0160589 A1 | 7/2006 | Okada |
| 2006/0161788 A1 | 7/2006 | Turpin |
| 2006/0161852 A1 | 7/2006 | Chen |
| 2006/0178966 A1 | 8/2006 | Jung |
| 2006/0178968 A1 | 8/2006 | Jung |
| 2006/0178975 A1 | 8/2006 | Jung |
| 2006/0184260 A1 | 8/2006 | Graepel |
| 2006/0190591 A1 | 8/2006 | Bobde |
| 2006/0194632 A1 | 8/2006 | Hendrickson |
| 2006/0195462 A1 | 8/2006 | Rogers |
| 2006/0234795 A1 | 10/2006 | Dhunjishaw |
| 2006/0252526 A1 | 11/2006 | Walker |
| 2006/0258462 A1 | 11/2006 | Cheng |
| 2006/0258463 A1 | 11/2006 | Cugno |
| 2007/0002057 A1 | 1/2007 | Danzig |
| 2007/0026934 A1 | 2/2007 | Herbrich |
| 2007/0026942 A1 | 2/2007 | Kinsley |
| 2007/0050716 A1 | 3/2007 | Leahy |
| 2007/0066400 A1 | 3/2007 | Kogo |
| 2007/0066403 A1 | 3/2007 | Conkwright |
| 2007/0073582 A1 | 3/2007 | Jung |
| 2007/0087799 A1 | 4/2007 | Van Luchene |
| 2007/0087822 A1 | 4/2007 | Van |
| 2007/0087831 A1 | 4/2007 | Van |
| 2007/0106526 A1 | 5/2007 | Jung |
| 2007/0111770 A1 | 5/2007 | Van |
| 2007/0111789 A1 | 5/2007 | van Deursen |
| 2007/0112574 A1 | 5/2007 | Greene |
| 2007/0112624 A1 | 5/2007 | Jung |
| 2007/0112706 A1 | 5/2007 | Herbrich |
| 2007/0117623 A1 | 5/2007 | Nelson |
| 2007/0117636 A1 | 5/2007 | Takahashi |
| 2007/0130001 A1 | 6/2007 | Jung |
| 2007/0155508 A1 | 7/2007 | Sun |
| 2007/0168444 A1 | 7/2007 | Chen |
| 2007/0168447 A1 | 7/2007 | Chen |
| 2007/0173323 A1 | 7/2007 | Johnson |
| 2007/0180040 A1 | 8/2007 | Etgen |
| 2007/0202951 A1 | 8/2007 | Bogosian |
| 2007/0214117 A1 | 9/2007 | Shu |
| 2007/0218987 A1 | 9/2007 | Van |
| 2007/0218997 A1 | 9/2007 | Cho |
| 2007/0223607 A1 | 9/2007 | Lehne |
| 2007/0226119 A1 | 9/2007 | Balser |
| 2007/0226176 A1 | 9/2007 | Bestgen |
| 2007/0233839 A1 | 10/2007 | Gaos |
| 2007/0247979 A1 | 10/2007 | Brillon |
| 2007/0255677 A1 | 11/2007 | Alexander |
| 2007/0260567 A1 | 11/2007 | Funge |
| 2007/0265718 A1 | 11/2007 | Graepel |
| 2007/0265969 A1 | 11/2007 | Horwat |
| 2007/0281285 A1 | 12/2007 | Jayaweera |
| 2007/0282695 A1 | 12/2007 | Toper |
| 2007/0288387 A1 | 12/2007 | Park |
| 2007/0298867 A1 | 12/2007 | Huang |
| 2008/0004094 A1 | 1/2008 | Mueller |
| 2008/0004116 A1 | 1/2008 | Van |
| 2008/0014917 A1 | 1/2008 | Rhoads |
| 2008/0019353 A1 | 1/2008 | Foote |
| 2008/0059304 A1 | 3/2008 | Kimsey |
| 2008/0064467 A1 | 3/2008 | Reiner |
| 2008/0086382 A1 | 4/2008 | Ur |
| 2008/0097891 A1 | 4/2008 | Park |
| 2008/0113815 A1 | 5/2008 | Weingardt |
| 2008/0120558 A1 | 5/2008 | Nathan |
| 2008/0126350 A1 | 5/2008 | Shoemaker |
| 2008/0133392 A1 | 6/2008 | Jung |
| 2008/0155019 A1 | 6/2008 | Wallace |
| 2008/0159634 A1 | 7/2008 | Sharma |
| 2008/0162317 A1 | 7/2008 | Banaugh |
| 2008/0176655 A1 | 7/2008 | James |
| 2008/0207327 A1 | 8/2008 | Van |
| 2008/0207329 A1 | 8/2008 | Wallace |
| 2008/0208749 A1 | 8/2008 | Wallace |
| 2008/0209527 A1 | 8/2008 | Dudley |
| 2008/0214287 A1 | 9/2008 | Lutnick |
| 2008/0215540 A1 | 9/2008 | Bestgen |
| 2008/0215975 A1 | 9/2008 | Harrison |
| 2008/0220876 A1 | 9/2008 | Mehta |
| 2008/0222104 A1 | 9/2008 | Stewart |
| 2008/0228607 A1 | 9/2008 | Jung |
| 2008/0235111 A1 | 9/2008 | Dotan |
| 2008/0242420 A1 | 10/2008 | Graepel |
| 2008/0252716 A1 | 10/2008 | Kano |
| 2008/0254893 A1 | 10/2008 | Patel |
| 2008/0263460 A1 | 10/2008 | Altberg |
| 2008/0268943 A1 | 10/2008 | Jacob |
| 2008/0270605 A1 | 10/2008 | Berstis |
| 2008/0270916 A1 | 10/2008 | Chen |
| 2008/0275789 A1 | 11/2008 | Ganz |
| 2008/0281622 A1 | 11/2008 | Hoal |
| 2008/0282090 A1 | 11/2008 | Leybovich |
| 2008/0288343 A1 | 11/2008 | Ho |
| 2008/0297515 A1 | 12/2008 | Bliss |
| 2008/0301405 A1 | 12/2008 | Kaufman |
| 2009/0005172 A1 | 1/2009 | Shibahara |
| 2009/0030774 A1 | 1/2009 | Rothschild |
| 2009/0063283 A1 | 3/2009 | Kusumoto |
| 2009/0075738 A1 | 3/2009 | Pearce |
| 2009/0083192 A1 | 3/2009 | Bokor |
| 2009/0088233 A1 | 4/2009 | O'Rourke |
| 2009/0089157 A1 | 4/2009 | Narayanan |
| 2009/0094225 A1 | 4/2009 | Cradick |
| 2009/0099925 A1 | 4/2009 | Mehta |
| 2009/0100352 A1 | 4/2009 | Huang |
| 2009/0113448 A1 | 4/2009 | Smith |
| 2009/0118006 A1 | 5/2009 | Kelly |
| 2009/0137320 A1 | 5/2009 | Kimura |
| 2009/0144633 A1 | 6/2009 | Schultz |
| 2009/0157495 A1 | 6/2009 | Cahuzac |
| 2009/0157625 A1 | 6/2009 | Jung |
| 2009/0209335 A1 | 8/2009 | Pearce |
| 2009/0210885 A1 | 8/2009 | Bantz |
| 2009/0216546 A1 | 8/2009 | Huang |
| 2009/0228550 A1 | 9/2009 | Kawachiya |
| 2009/0234948 A1 | 9/2009 | Garbow |
| 2009/0235191 A1 | 9/2009 | Garbow |
| 2009/0248544 A1 | 10/2009 | Ganz |
| 2009/0253494 A1 | 10/2009 | Fitch |
| 2009/0254417 A1 | 10/2009 | Beilby |
| 2009/0280909 A1 | 11/2009 | Mceniry |
| 2009/0287765 A1 | 11/2009 | Hamilton |
| 2009/0299960 A1 | 12/2009 | Lineberger |
| 2009/0307021 A1 | 12/2009 | Hamilton |
| 2009/0325711 A1 | 12/2009 | Bronstein |
| 2010/0030578 A1 | 2/2010 | Siddique |
| 2010/0131864 A1 | 5/2010 | Bokor |
| 2010/0169798 A1 | 7/2010 | Hyndman |
| 2010/0169800 A1 | 7/2010 | Lance |
| 2010/0173701 A1 | 7/2010 | Van Luchene |
| 2010/0173713 A1 | 7/2010 | Van Luchene |
| 2010/0203963 A1 | 8/2010 | Allen |
| 2010/0205179 A1 | 8/2010 | Carson |
| 2010/0210349 A1 | 8/2010 | Blair |
| 2010/0267450 A1 | 10/2010 | Mcmain |
| 2010/0280919 A1 | 11/2010 | Everett |
| 2010/0293569 A1 | 11/2010 | Kusumoto |
| 2010/0304839 A1 | 12/2010 | Johnson |

(56) References Cited

U.S. PATENT DOCUMENTS

| | | |
|---|---|---|
| 2010/0306672 A1 | 12/2010 | Mceniry |
| 2011/0010270 A1 | 1/2011 | Hamilton |
| 2011/0092279 A1 | 4/2011 | Pilip |
| 2011/0107433 A1 | 5/2011 | Steelberg |
| 2011/0126272 A1 | 5/2011 | Betzler |
| 2011/0131085 A1 | 6/2011 | Wey |
| 2011/0190063 A1 | 8/2011 | Kajii |
| 2011/0208615 A1 | 8/2011 | Steelberg |
| 2011/0212762 A1 | 9/2011 | Ocko |
| 2011/0261071 A1 | 10/2011 | Ganetakos |
| 2011/0281638 A1 | 11/2011 | Bansi |
| 2012/0009997 A1 | 1/2012 | Youm |
| 2012/0010734 A1 | 1/2012 | Youm |
| 2012/0015736 A1 | 1/2012 | Vanbragt |
| 2012/0021823 A1 | 1/2012 | Youm |
| 2012/0021825 A1 | 1/2012 | Harp |
| 2012/0064968 A1 | 3/2012 | Youm |
| 2012/0094751 A1 | 4/2012 | Reynolds |
| 2012/0122552 A1 | 5/2012 | Youm |
| 2012/0142429 A1 | 6/2012 | Muller |
| 2012/0190456 A1 | 7/2012 | Rogers |
| 2012/0244950 A1 | 9/2012 | Braun |
| 2012/0315993 A1 | 12/2012 | Dumont |
| 2012/0316999 A1 | 12/2012 | Koh |
| 2013/0111367 A1 | 5/2013 | Park |
| 2013/0143670 A1 | 6/2013 | Junkin |
| 2013/0225260 A1 | 8/2013 | Cudak |
| 2013/0252737 A1 | 9/2013 | Mescon |
| 2013/0260876 A1 | 10/2013 | Margalith |
| 2013/0266927 A1 | 10/2013 | Mann |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0024445 A1 | 1/2014 | Aller |
| 2014/0162763 A1 | 6/2014 | Kim |
| 2014/0162781 A1 | 6/2014 | Butler |
| 2014/0235356 A1 | 8/2014 | Yamane |
| 2014/0274402 A1 | 9/2014 | Michel |
| 2014/0342808 A1 | 11/2014 | Chowdhary |
| 2014/0344725 A1 | 11/2014 | Bates |
| 2014/0349753 A1 | 11/2014 | Lmai |
| 2015/0024852 A1 | 1/2015 | Pacey |
| 2015/0031426 A1 | 1/2015 | Alloway |
| 2015/0038233 A1 | 2/2015 | Rom |
| 2015/0051000 A1 | 2/2015 | Henn |
| 2015/0220836 A1 | 8/2015 | Wilson |
| 2015/0310698 A1 | 10/2015 | Polis |
| 2016/0001181 A1 | 1/2016 | Marr |
| 2016/0001182 A1 | 1/2016 | Marr |
| 2016/0001186 A1 | 1/2016 | Marr |
| 2016/0005270 A1 | 1/2016 | Marr |
| 2016/0067611 A1 | 3/2016 | Ware |
| 2016/0067612 A1 | 3/2016 | Ntoulas |
| 2016/0166935 A1 | 6/2016 | Condrey |
| 2016/0191671 A1 | 6/2016 | Dawson |
| 2016/0296840 A1 | 10/2016 | Kaewell |
| 2016/0358239 A1 | 12/2016 | Inagaki |
| 2017/0052676 A1 | 2/2017 | Pulier |
| 2017/0178236 A1 | 6/2017 | Saigh |
| 2017/0206797 A1 | 7/2017 | Solomon |
| 2017/0259178 A1 | 9/2017 | Aghdaie |
| 2017/0264681 A1 | 9/2017 | Apte |
| 2017/0279719 A1 | 9/2017 | Faith |
| 2018/0104586 A1 | 4/2018 | Kim |
| 2018/0104595 A1 | 4/2018 | Kawachiya |
| 2018/0169515 A1 | 6/2018 | Rice |
| 2018/0280806 A1 | 10/2018 | Otomo |
| 2018/0308473 A1 | 10/2018 | Scholar |
| 2019/0043239 A1 | 2/2019 | Goel |
| 2019/0081848 A1 | 3/2019 | Zou |
| 2019/0126150 A1 | 5/2019 | Tartaj |
| 2019/0205727 A1 | 7/2019 | Lin |
| 2019/0295306 A1 | 9/2019 | Weston |
| 2019/0340419 A1 | 11/2019 | Milman |
| 2020/0122040 A1 | 4/2020 | Juliani, Jr. |
| 2020/0145615 A1 | 5/2020 | Seko |
| 2020/0311245 A1 | 10/2020 | Pollard |
| 2020/0372400 A1 | 11/2020 | Carreira-Perpiñán |
| 2020/0401576 A1 | 12/2020 | Yerli |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1858757 A | 11/2006 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0969430 A1 | 1/2000 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 2005050081 A | 2/2005 |
| JP | 2005234633 A | 9/2005 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |

(56) References Cited

FOREIGN PATENT DOCUMENTS

| | | |
|---|---|---|
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Jancke, Gavin, et al., Linking Public Spaces: Technical and Social Issues, CHI 2001, Mar. 31-Apr. 5, 2006, vol. No. 4, issue No. 1.
"CMAX Promotional Footwear," http://web.archive.org/web/20040405163227/http://promo.customatix.com/, Apr. 5, 2004.
"Fascinating Facts about the Invention of Cabbage Patch kids by Xavier Roberts in 1983," http://www.ideafinder.com/history/inventions/cabbagepatch.htm, Oct. 25, 2006.
Barr et al., "Changing the Virtual Self, Avatar Transformations in Popular Games," 8 pages, pulled from http://www.mcs.vuw.ac.nz/.about.chikken/research/papers/cgie2006/Transfor-mingVirtualSelf.pdf.
Ma et al., "A Scalable Parallel Cell-Projection Volume Rendering Algorithm for Three-Dimensional Unstructured Data", IEEE 1997, pp. 1-10.
Hassen et al., "A Task-and Data-Parallel Programming Language Based on Shared Objects," ACM Transactions on Programming Languages and Systems, vol. 20, No. 6, Nov. 1998, pp. 1131-1170.
Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.
Kautz, H., B. Selman, M. Shah.. "Referral Web: Combining Social Networks and Collaborative Filtering". Communications of the ACM, vol. 40, No. 3, Mar. 1997.
Schwartz, M. F., D. C. M. Wood. "Discovering shared interests among people using graph analysis of global electronic mail traffic". Department of Computer Science, University of Colorado, Boulder CO. Oct. 1992.
Wellman, B. "For a social network analysis of computer networks: a sociological perspective on collaborative work and virtual community". Proceedings of the 1996 conference on ACM SIGCPR/SIGMIS. 1-11.
Qureshi, S. "Supporting electronic group processes: a social perspective". Proceedings of the 1995 ACM SIGCPR Conference on Supporting teams, groups, and learning inside the IS function. ACM Press. 24-34.
Ackerman, M.S., B. Starr. "Social activity indicators: interface components for CSCW systems". Proceedings of the 8th ACM Symposium on User Interface and Software Technology. ACM Press. 159-168, Nov. 14-17, 1995.

Garton, L., C. Haythornthwaite, B. Wellman. "Studying on-line social networks in Doing Internet Research", Jun. 1997.
Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for ACK SIGKDD 1999. ACM Press. 182-236.
International Search Report as Published as WO2005/079538 in corresponding international application No. PCT/US2005/005550, dated Jul. 5, 2006.
IBM developerWorks, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Duong et al.; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911 &coll=GUIDE&dl=GUIDE&CFID=41712537&CFTOKEN=50783297. Nov. 11, 2002.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI=http://doi.acm.org/10.1145/566500.566504.
Lee et al., "A Self-Adjusting Data Distribution Mechanism for Multidimensional Load Balancing in Multiprocessor-Based Database Systems," Information Systems vol. 19, No. 7, pp. 549-567, 1994.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Andert, "A Simulation of Dynamic Task Allocation in a Distributed Computer System," Proceedings of the 1987 Winter Simulation Conference, 1987, pp. 1-9.
Roaming Virtual World Is a Real Trip; [Final Edition] Leslie Walker. The Washington Post. Washington, D.C.: Mar. 30, 2006.
E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.
Peter Jorissen et al., "Dynamic Interactions in Physically Realistic Collaborative Virtual Environments," 2005, IEEE Transactions on Visualization and Computer Graphics, vol. 11, No. 6, published by IEEE Computer Society, pp. 649-660.
"Universally Unique Identifier", 2006 (http://en.wikipedia.org/wiki/UUID).
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.
V. Stojanovic, "Virtual boutique-try clothes on-line", 5th International Conference on Telecommunications in Modern Satellite, Cable and Broadcasting Service. TELSIKS 2001. Proceedings of Papers (Cat. No.01EX517), 2001, pt. 2, p. 802-3 vol.2.

\* cited by examiner

| Overall Rank | Overall Level | PLAYER NAME | Game A | Game B | Game C |
|---|---|---|---|---|---|
| 1 | 33 ☐ | MEGARACER | 150750 | 3015 | 1847 |
| 1 | 33 | MEGARACER | 150750 | 3015 | 1847 |
| 2 | 33 ◯ | YKEminence | 146350 | 2927 | 1338 |
| 3 | 27 ◯ | iTi Amyst | 108700 | 2174 | 1337 |
| 4 | 34 ◯ | aXis Ranger | 103100 | 2062 | 558 |
| 5 | 26 ◯ | Risqii | 101600 | 2032 | 1668 |
| 6 | 23 ◯ | Apple Bloom xo | 97300 | 1946 | 958 |
| 7 | 27 ◯ | TcWHK | 96200 | 1924 | 1344 |
| 8 | 23 ◯ | Armezia | 96000 | 1920 | 895 |
| 9 | 43 ✧ | Teh bakess | 90800 | 1816 | 885 |
| 10 | 26 ◯ | Juhnt | 87650 | 1753 | 786 |
| 11 | 30 ■ | For My Bloods | 83950 | 1679 | 1054 |
| 12 | 20 ◯ | Prodigy WAG1 | 78650 | 1573 | 672 |
| 13 | 58 ✻✻ | UryKaN MoMz | 77900 | 1558 | 584 |
| 14 | 26 ◯ | Tchhy | 77350 | 1547 | 594 |
| 15 | 27 ◯ | ‖BENNO‖ | 76450 | 1529 | 676 |
| 16 | 18 ⊚ | EG Areseus | 69300 | 1386 | 484 |
| 17 | 30 ■ | ‖ZipaDee‖ | 66800 | 1336 | 775 |

LEADERBOARDS
FREE-FOR-ALL / ALL

Ⓑ Back    Ⓐ Select    Ⓨ Filter    ⓧ Top    ⊕ Page Up    ⊕ Page Down

FIG. 2

SYSTEMS AND METHODS FOR MANAGING VIRTUAL ITEMS ACROSS MULTIPLE VIDEO GAME ENVIRONMENTS

CROSS-REFERENCE

The present application is a continuation application of U.S. patent application Ser. No. 15/953,934, entitled "Video Game Content Aggregation, Normalization, and Publication Systems and Methods" and filed on Apr. 16, 2018, which relies on U.S. Patent Provisional Application No. 62/610,021, of the same title, and filed on Dec. 22, 2017, for priority, both of which are herein incorporated by reference in their entirety.

FIELD

The present specification is related generally to the field of gaming, animation and computer graphics. More specifically, the present specification discloses systems and methods for aggregating, normalizing, and publishing video game content across different video game titles hosted and/or managed by a plurality of different gaming servers.

BACKGROUND

The proliferation of broadband services allows for a greater number of people to enjoy computer or video games, which exist in several genres. For example in some computer games, players conquer territories for ever-increasing rewards. In many role-playing games (RPG) or first-person shooter (FPS) games, players develop unique characters and, by controlling the actions of the characters they create during gameplay, the players (via their characters) accumulate various objects and abilities through extended play. The rules for how quickly, how many, and what type of abilities and objects a character may earn or gain usually involves several ratings or statistics. These ratings determine the outcome of various chance or future events that lead to new objects and abilities.

In many games, a player may compete against another player either in person or via an online game. Many online games offer leaderboards which allow a player to judge how a particular game play session compares against other game players. Most leaderboards measure a level achieved and certain standard statistics, such as the amount of time played to achieve the level. Simple performance metrics are often used to display basic statistics on performance. Examples of such metrics include the number of kills, kill/death ratio, scores, achievements, timings, and levels passed. This data is transmitted by the game client, running on the player's home console or personal computer (PC), to the leaderboards service hosted at the back end of the gaming system.

The ability to evaluate their performance, at varying degrees of detail, in real-time is important for video game players, especially when playing competitive online multi-player games. Further, many players are driven by and also desire to compete at all levels of game play. For example, a player may desire to not only be the player with the highest score but also to be the best/highest-ranked player with a particular game weapon or accessory or a combination thereof. Further, a player may desire to achieve highest levels or rankings in not only one game but also of other games in the same genre or to be able to play at a level achieved in one game in another game of the same genre.

From a player's perspective, certain games may have an endpoint or hit a plateau where the player's enjoyment stagnates because the player has achieved the biggest challenge possible or has used all of the assets available to him or her in achieving an objective. Users may then want to try other games in the same genre, but they also have a tendency to be discouraged if they do not win or acquire any assets in a few consecutive games, if they are not able to play at a level they are accustomed to, if they perceive a game level to be too complex, or if the game rewards are not forthcoming.

Further, several players of a video game are not always engaged with the video game. Some players may play the game intermittently. Other players may visit the game website or use the game app only in rare instances. Especially in the smart device market segment, users are very time sensitive and tend to skip or switch to another game, application, channel or device webpage, whenever they do not feel engaged with a game.

Thus, there is a need for a method and system that allows for video games to be designed such that they maximize player engagement and retention and also improves the experience of playing and performing in video games for players.

There is also a need to enable a player's game statistics, specific to a particular game, to be reformatted and processed in a manner that would allow those statistics to be compared to the game statistics of other players from other games that share the same genre. For example, similar statistics are used to measure the performance of players in a given genre, e.g. first person shooter games use number of kills, kill/death ratio, scores, achievements, timings, and levels passed. To create greater player liquidity between games, it would be preferable to rank players in a manner that transcends a single game and, preferably, across all games in a given genre, thereby enabling a player to determine how he or she is ranked not just for Game X but for across all games, including Game X, in that given genre. There is therefore a need for aggregating, normalizing and publishing a user's cross-game performance data indicative of the user's overall unified ranking or skill level across different games from the same genre to identify other players with similar skill levels for a match and enable the user to start a new game at a level commensurate with the user's overall ranking or skill level.

There is also need to enable the cross-game trading of virtual items. To create greater player liquidity between games, it would be preferable to have a system that can allow players to trade virtual items between distinct and separate games. Therefore, there is a need for systems and methods that normalize and publish trading values for a plurality of virtual items acquired by the user, thereby enabling trading of the virtual items amongst players across different games.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a video game content aggregation, normalization, and publication system for aggregating, normalizing, and publishing data acquired by, and stored within, a plurality of distributed video game servers, wherein each of said plurality of distributed video game servers is configured to host and manage a video game of a plurality of programmatically separate video games and wherein each of said plurality of distributed video game servers is in data communication with remotely located client devices configured to execute an instance of a video game of the plurality of programmatically separate video games, the system comprising: a programmable clock configured to generate a time-based trigger; one or more game server interface call modules, wherein the one or more game server interface call modules are in data communication with the programmable clock, are configured to generate and transmit interface calls to one or more game servers of the plurality of distributed video game servers based upon said time-based trigger, and are configured to receive game server data from the one or more game servers of the plurality of distributed video game servers based upon said interface calls; a database in data communication with the one or more game server interface call modules, wherein the database is configured to receive and store the game server data; a video game content aggregation module in data communication with the database, wherein the video game content aggregation module is configured to acquire game server data from the database, determine a normalization process to be applied to the game server data based upon a portion of the game server data and to apply the determined normalization process to said portion of the game server data to generate normalized video game content; and a publication module in data communication with the video game content aggregation module, wherein the publication module is configured to format and transmit the normalized video game content to a plurality of electronic addresses.

Optionally, each of the plurality of programmatically separate video games belongs to the same genre.

Optionally, the normalization process comprises determining a weighted average of scores generated by players of the plurality of programmatically separate video games.

Optionally, the normalized video game content comprises a ranking of players of the plurality of programmatically separate video games. Optionally, the video game content aggregation, normalization, and publication system further comprises a matchmaker module, wherein the matchmaker module is configured to match a first player and a second player for a future game and wherein the match is based on the normalized video game content comprising the ranking of players.

Optionally, the video game content aggregation, normalization, and publication system further comprises a recommendation module, wherein the recommendation module is configured to recommend a new game to a player based on the normalized video game content and wherein the normalized video game content is indicative of an expertise level of the player.

In some embodiments, the present specification discloses a method for aggregating and normalizing data across a plurality of different video games to achieve uniform data values, wherein each of said plurality of different video games is executed by at least one game server and rendered on a plurality of client devices and configured to played by users of said plurality of client devices and wherein said at least one game server is in communication with a database that stores game data, the method comprising: accessing said at least one game server to obtain game data for each of said plurality of different video games, wherein the game data comprises information pertaining to gameplay; normalizing the game data across all the plurality of different video games played by a single user; and generating a unified ranking for said user, wherein said unified ranking is indicative of the single user's aggregated performance in gameplay sessions played across all the plurality of different video games.

Optionally, said method is executed by an aggregation module comprising a plurality of programmatic instructions, wherein the aggregation module is executed by server device comprising a processor and a non-transient memory and wherein said aggregation module accesses the game data stored in a database associated with said at least one game server.

Optionally, each of the plurality of different video games belongs to the same genre.

Optionally, normalizing the game data comprises determining a weighted average of scores generated by users of the plurality of different video games.

Optionally, the method further comprises normalizing the game data across all the plurality of different video games played by all users and generating a unified ranking for all users, wherein said unified ranking is indicative of all users' aggregated performances in gameplay sessions played across all the plurality of different video games. Optionally, the method further comprises using a matchmaker module, wherein the matchmaker module is configured to match a first player and a second player for a future game and wherein the match is based on the unified ranking for all users.

Optionally, the method further comprises using a recommendation module to recommend a new game to the single user based on the unified ranking.

In some embodiments, the present specification discloses a non-transitory computer program product for aggregating, normalizing, and publishing data acquired by, and stored within, a plurality of distributed video game servers, wherein each of said plurality of distributed video game servers is configured to host and manage a video game of a plurality of programmatically separate video games and wherein each of said plurality of distributed video game servers is in data communication with remotely located client devices configured to execute an instance of a video game of the plurality of programmatically separate video games, the product comprising: a programmable clock configured to generate a time-based trigger; one or more game server interface call modules, wherein the one or more game server interface call modules are in data communication with the programmable clock, are configured to generate and transmit interface calls to one or more game servers of the plurality of distributed video game servers based upon said time-based trigger, and are configured to receive game server data from the one or more game servers of the plurality of distributed video game servers based upon said interface calls; a database in data communication with the one or more game server interface call modules, wherein the database is configured to receive and store the game server data; a video game content aggregation module in data communication with the database, wherein the video game content aggregation module is configured to acquire game server data from the database, determine a normalization process to be applied to the game server data based upon a portion of the game server data and to apply the determined normalization process to said portion of the game server data to generate normalized video game content; and a publication module in data communication with the video game content aggregation module, wherein the publication module is configured to format and transmit the normalized video game content to a plurality of electronic addresses.

Optionally, each of the plurality of programmatically separate video games belongs to the same genre.

Optionally, the normalization process comprises determining a weighted average of scores generated by players of the plurality of programmatically separate video games.

Optionally, the normalized video game content comprises a ranking of players of the plurality of programmatically separate video games. Optionally, the non-transitory computer program product further comprises a matchmaker module, wherein the matchmaker module is configured to match a first player and a second player for a future game and wherein the match is based on the normalized video game content comprising the ranking of players.

Optionally, the non-transitory computer program product further comprises a recommendation module, wherein the recommendation module is configured to recommend a new game to a player based on the normalized video game content and wherein the normalized video game content is indicative of an expertise level of the player.

In some embodiments, the present specification discloses a method for aggregating and normalizing data across a plurality of different video games to achieve uniform data values, said plurality of different video games being executed by at least one game server and rendered on a plurality of client devices to be played by users of said client devices, said at least one game server being in communication with a database that stores game data, the method comprising: accessing said at least one game server to obtain game data for a plurality of games, said game data comprising information about virtual items associated with game environments of said plurality of different video games; storing game data comprising information about the virtual items from the plurality of different video games in the database; acquiring the game data comprising information about the virtual items from the database; normalizing the game data comprising information about the virtual items, such that a value of a virtual item from one of the plurality of different video games can be compared with a value of a virtual item from another one of the plurality of different video games; and generating data representative of a user interface, wherein the user interface is configured to allow multiple users to concurrently trade virtual items from different ones of the plurality of different video games based on the normalized values of said virtual items.

Optionally, each of the plurality of different video games belongs to the same genre.

Optionally, normalizing the game data comprises assessing a value of each virtual item based at least partially on its rarity.

Optionally, normalizing the game data comprises assigning each virtual item to a category and wherein a value of each virtual item is assessed based at least partially on its category.

Optionally, normalizing the game data comprises assessing a value of each virtual item based at least partially on a percentage of users who have the virtual item.

Optionally, normalizing the game data comprises assessing a value of each virtual item based at least partially on a cost of purchasing the virtual item.

Optionally, normalizing the game data comprises assessing a value of each virtual item based at least partially on a level at which the virtual item is available for purchase or as a reward to a player.

Optionally, normalizing the game data comprises assessing a value of each virtual item based at least partially on whether the virtual item is achieved only as a reward after winning a certain number of matches.

Optionally, the method further comprises using a recommendation module to recommend a virtual item for trade based a value of a virtual item owned by a user.

In some embodiments, the present specification discloses a system for aggregating and normalizing game data from a plurality of different video games in order to standardize and publish values for the game data, said plurality of different video games being executed by a plurality of game servers and rendered on a plurality of client devices to be played by users of said plurality of client devices, said plurality of game servers being in communication with a database that stores the game data, the system comprising: one or more game server interface call modules, wherein the one or more game server interface call modules are configured to generate and transmit interface calls to the plurality of game servers and are configured to receive game data from the plurality of game servers based upon the interface calls and wherein the game data comprises information about virtual items owned by the users of said plurality of client devices and associated with game environments from the plurality of different video games; said database in data communication with the one or more game server interface call modules, wherein the database is configured to receive and store the game data; a video game content aggregation module in data communication with the database, wherein the video game content aggregation module is configured to acquire game data from the database, determine a normalization process to be applied to the game data based upon a portion of the game data and to apply the determined normalization process to the portion of the game data such that a value of a virtual item from one of the plurality of different video games can be compared with a value of a virtual item from another one of the plurality of different video games; and a publication module in data communication with the video game content aggregation module, wherein the publication module is configured to generate data representative of a user interface, wherein the user interface is configured to enable with multiple users to concurrently trade virtual items from different ones of the plurality of different video games based on the normalized values of said virtual items.

Optionally, each of the plurality of different video games belong to the same genre.

Optionally, the normalization process comprises assessing a value of each virtual item based at least partially on its rarity.

Optionally, the normalization process comprises assigning each virtual item to a category and wherein a value of each virtual item is assessed based at least partially on its category.

Optionally, the normalization process comprises assessing a value of each virtual item based at least partially on a percentage of users who have the virtual item.

Optionally, the normalization process comprises assessing a value of each virtual item based at least partially on a cost of purchasing the virtual item.

Optionally, the normalization process comprises assessing a value of each virtual item based at least partially on a level at which the virtual item is available for purchase or as a reward to a player.

Optionally, the normalization process comprises assessing a value of each virtual item based at least partially on whether the virtual item is achieved only as a reward after winning a certain number of matches.

Optionally, the system further comprises a recommendation module configured to recommend a virtual item for trade based a value of a virtual item owned by a user.

In some other embodiments, the present specification discloses a video game content aggregation, normalization, and publication system for aggregating, normalizing, and publishing data acquired by, and stored within, a plurality of distributed video game servers, wherein each of said plurality of distributed video game servers is configured to host and manage a video game title of a plurality of different video game titles and wherein each of said plurality of distributed video game servers is in data communication with remotely located client devices configured to execute an instance of a video game title of the plurality of different video game titles, the system comprising: a programmable clock configured to generate a time-based trigger; one or more game server interface call modules, wherein the one or more game server interface call modules are in data communication with the programmable clock, are configured to generate and transmit interface calls to one or more game servers of the plurality of distributed video game servers based upon said time-based trigger, and are configured to receive game server data from the one or more game servers of the plurality of distributed video game servers based upon said interface calls; a database in data communication with the one or more game server interface call modules, wherein the database is configured to receive and store the game server data; a video game content aggregation module in data communication with the database, wherein the video game content aggregation module is configured to acquire game server data from the database based upon X, determine a normalization process to be applied to the game server data based upon a portion of the game server data and to apply the determined normalization process to said portion of the game server data to generate normalized video game content; and a publication module in data communication with the video game content aggregation module, wherein the publication module is configured to format and transmit the normalized video game content to a plurality of electronic addresses.

In some embodiments, the present specification discloses a method for aggregating and normalizing data across a plurality of different video games to achieve uniform data values, said video games being executed by at least one game server to be rendered on a plurality of client devices to be played by users of said client devices, said at least one game server being in communication with a database that stores game data, the method comprising: accessing said at least one game server to obtain game data for a plurality of games, including user data and results pertaining to gameplay; normalizing user data and results for all the games played by a single user; and generating a unified ranking for said user, corresponding to all the games played by that user.

Optionally, said method is executed by an aggregation module comprising a plurality of programmatic instructions, said aggregation module being executed by server device comprising a processor and a non transient memory.

Optionally, said server device is one of the game servers.

Optionally, said aggregation module accesses the game data stored in a database associated with said at least one game server.

Optionally, said aggregation module accesses the game data in a secure manner.

Optionally, said results comprise any statistical data associated with a game played.

Optionally, said at least one game server is implemented by a cloud of computing platforms operating to render the game on a plurality of client devices.

In some embodiments, the present specification discloses a method for aggregating and normalizing data across a plurality of different video games to achieve uniform data values, said video games being executed by at least one game server to be rendered on a plurality of client devices to be played by users of said client devices, said at least one game server being in communication with a database that stores game data, the method comprising: accessing said at least one game server to obtain game data for a plurality of games, said game data pertaining to virtual items associated with the game environments of said plurality of games; normalizing data associated with said virtual items of said plurality of games, such that virtual items from one game can be fairly compared with virtual items from another game; generating a normalized and unified score for each virtual item; and allowing the users to trade virtual items across different games based on the respective scores of said virtual items.

Optionally, said method is executed by an aggregation module comprising a plurality of programmatic instructions, said aggregation module being executed by server device comprising a processor and a non transient memory.

Optionally, said server device is one of the game servers.

Optionally, said aggregation module accesses the game data stored in a database associated with said at least one game server.

Optionally, said aggregation module accesses the game data in a secure manner.

Optionally, all the virtual items belonging to one category are assigned the same score.

Optionally, the score of a virtual item is a function of its rarity and availability.

Optionally, trade between virtual items of different games is facilitated by means of a Graphical User Interface (GUI) rendered on said client devices.

Optionally, the GUI is generated by a third party device, outside the game server.

Optionally, said third party device is implemented by a cloud of computing platforms.

Optionally, said third party device comprises a website or a computing app.

In some embodiments, the present specification discloses a system for aggregating and normalizing data across a plurality of different video games to achieve uniform data values, said video games being rendered on a plurality of client devices to be played by users of said client devices, the system comprising: at least one game server having a processor and a plurality of programmatic instructions stored in a non-transient memory, wherein said plurality of programmatic instructions are executed by the processor for rendering said video games, said at least one game server being in communication with a database that stores game data; and an aggregation module comprising a plurality of programmatic instructions, said aggregation module being executed by server device comprising a processor and a non transient memory, wherein said aggregation module: accesses the database associated with said at least one game server to obtain game data for a plurality of games, said game data including user data and results pertaining to gameplay; normalizes user data and results for all the games played by a single user; and generates a unified ranking for said user, corresponding to all the games played by that user.

Optionally, said aggregation module accesses the game data in a secure manner.

The aforementioned and other embodiments of the present shall be described in greater depth in the drawings and detailed description provided below.

BRIEF DESCRIPTION OF THE DRAWINGS

FIG. 2 illustrates an exemplary GUI screen that displays aggregated results to a user, according to an embodiment of the specification;

DETAILED DESCRIPTION

Figure 1:
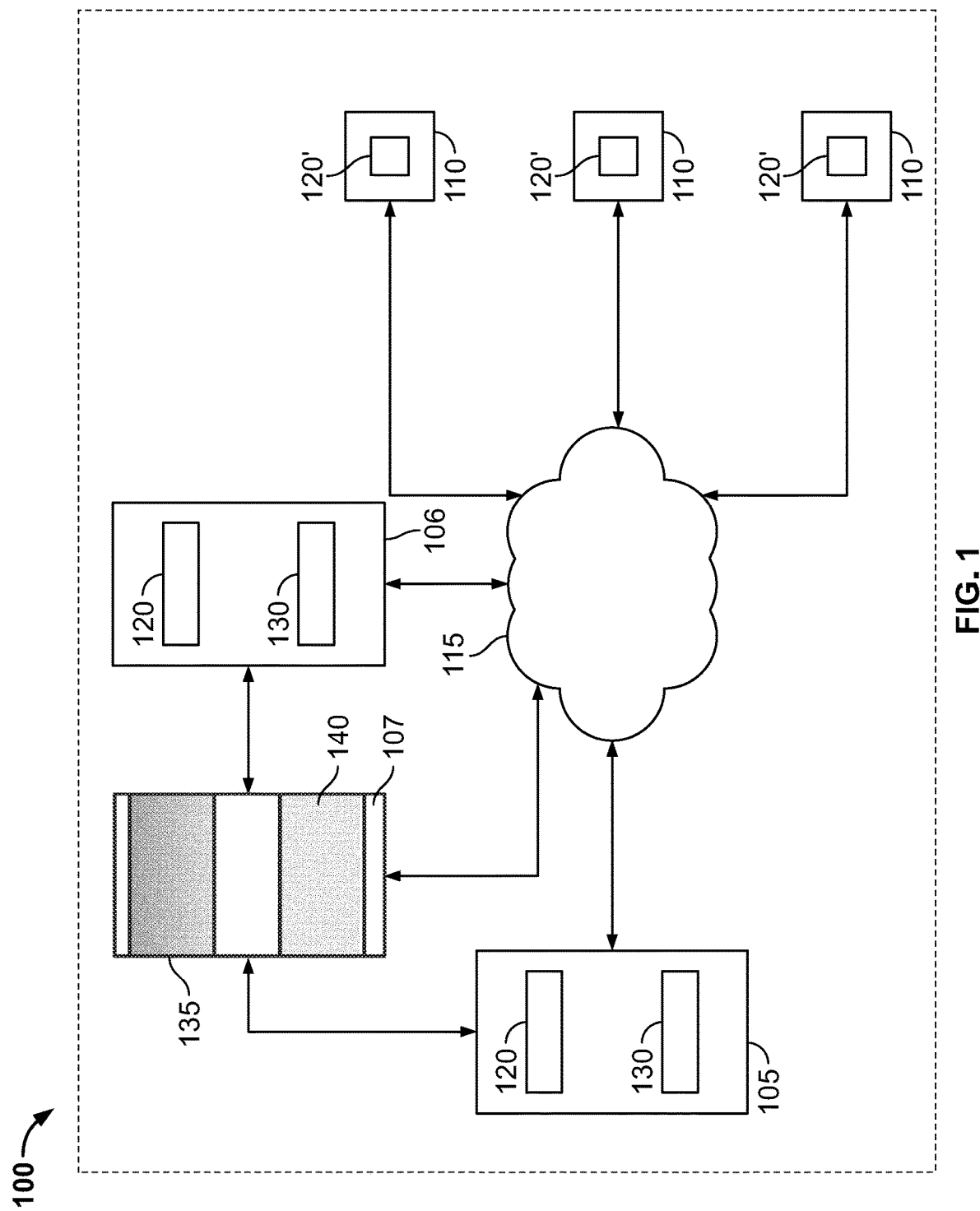
FIG. 1 is a block diagram illustration of client-server architecture of a gaming system, in accordance with embodiments of the present specification.

In various embodiments, the present specification describes a system and method for aggregating, normalizing and publishing a user's cross-game performance data indicative of the user's overall unified ranking or skill level across different games to identify other players with similar skill levels for a match and enable the user to start a new game at a level commensurate with the user's overall ranking or skill level. In various other embodiments, the present specification also describes methods of normalizing and publishing trading values or scores for a plurality of virtual items acquired by the user and enabling trading of the virtual items amongst players.

In an embodiment, the present specification describes a system and method for aggregating user results, rankings and other statistical data associated with playing video games across two or more games, normalizing the aggregated data to unified values and presenting or publishing the aggregated and unified data via a single interface, such that data from one game may be fairly combined, traded, and/or compared to data from another game.

In an embodiment, the present system allows a user to obtain a unified ranking, score or metric across multiple games, especially when the games are of a similar genre. In an embodiment, the present system also allows game programs to match players, that is, put together players of similar strengths or rankings for matches or multiplayer game events without the need for gathering performance data from the game that the players wish to play. Thus, a player's universal performance data may be used to match players in a new game for which the players may not have yet generated performance data.

In yet another embodiment, the present system accesses a user's unified overall ranking or skill level to allow the user to start playing a new game at a level according to the user's overall ranking or skill level.

In other embodiments, the present system allows users of one game to trade game-related virtual items with users of another game. This is enabled by providing a normalized score or value for virtual items, based upon item attributes such as, but not limited to, rarity level, power level and/or community use level, that allows virtual items associated with one game to be fairly compared against virtual items of another game.

While aspects of the present specification may be described herein with reference to particular types of video game genres, the system and method described in detail herein may be used in any genre of single or multiplayer video games.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise. The term "plurality of programmatically separate video games" means more than one video game where each of the video games comprises one or more separate executable files and can be fully played and engaged with independent of any other video game.

Exemplary System Architecture

FIG. 1 illustrates a gaming system 100, in accordance with an embodiment of the present specification. The system 100 comprises client-server architecture, where one or more game servers 105, 106 are in communication with one or more remotely located client devices 110 over a network 115. Users may access the system 100 via the client devices 110 that may include, but not be limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105, 106 over the network 115. The one or more game servers 105, 106 are responsible for hosting, running, or executing a video game, and the remotely located client devices 110 are configured to execute an instance of the video game.

The video game may be from any video game genre. Video game genres include 1) action games, such as platform, shooter, fighting, stealth, survival, and rhythm games, 2) action-adventure games, such as survival horror or metroidvania games, 3) adventure games, such as text, graphic, visual, interactive or real-time 3D adventures, 4) role-playing games, such as action RPG, MMORPG, Roguelikes, tactical RPG, sandbox RPG, first-person party-based RPG, cultural differences, choices, or fantasy games, 5) simulation games, construction and management simulation, life simulation, or vehicle simulation games, 6) strategy games, such as 4X, artillery, real-time strategy, real-time tactics, multiplayer online baffle arena, tower defense, turn based strategy, turn based tactics, wargame, or grand strategy games, 7) sports games, such as racing, competitive, basketball, football, baseball, soccer, hockey, or sports-based fighting, or 8) the following other genres: MIMO, casual, party, programming, logic, trivia, board, card, advergame, art, or educational.

Game Servers 105, 106

The one or more game servers 105, 106 can be any computing device having one or more processors and one or more computer-readable storage media such as RAM, hard disk or any other optical or magnetic media. The one or more game servers 105, 106 include a plurality of hardware, software, and/or firmware components operating together to provide or implement a plurality of functional, operational or service-oriented modules. In some embodiments, the one or more game servers 105, 106 include or are in communication with a game database system (not shown). In one embodiment, each game server is associated with a separate game database system. In another embodiment, a common database system may serve two or more game servers. The game database system stores a plurality of game data associated with one or more games that are served or provided to the client devices 110 over the network 115. In one embodiment, the game database system comprises a plurality of databases, each storing a different kind of data. For example, data associated with leaderboard or gameplay results may be stored in a different database, while error reports associated with a game may be stored in a different database. In some embodiments, the one or more game servers 105, 106 may be implemented by a cloud of computing platforms operating together as game servers. In embodiments, a game server is another home console, a personal computing device, such as a laptop or tablet PC, or a dedicated server.

In one embodiment, the gaming system 100 comprises a plurality of distributed video game servers, wherein each of the distributed video game servers is configured to host and manage a video game title. As defined herein, the distributed game servers refer to a system of computing platforms that are capable of communicating and coordinating with one another. In one embodiment, the computing platforms comprising the distributed servers are hosted on the cloud. For the purpose of the present specification, a video game title is defined as an electronic game that involves interaction with a user interface to generate visual feedback on a display device.

In accordance with aspects of the present specification, the one or more game servers 105, 106 provide or implement a plurality of modules such as, but not limited to, a master game module 120 and a master leaderboard module 130. In one embodiment, the various modules are hosted on a cloud of computing platforms, collectively known as the backend. In the following description, the terms 'game server' and 'backend' are used interchangeably. In some embodiments, the one or more client devices 110 are configured to implement or execute one or more of the plurality of modules that are the same as or similar to the modules of the one or more game servers 105. For example, in some embodiments the client devices 110 execute a client-side game module 120'.

It should be appreciated that the term 'module' refers to computer logic utilized to provide a desired functionality, service or operation. In various embodiments, a module can be implemented in hardware, firmware and/or software controlling a general purpose processor. In one embodiment, the modules are programmatic codes or computer executable instructions stored on a storage system, such as the game database system, and executed by a processor.

Master Game Module 120

In embodiments, the master game module 120 is configured to execute an instance of an online game to facilitate interaction of the users with the game. In embodiments, the instance of the game executed may be synchronous, asynchronous, and/or semi-synchronous. For the purpose of the present specification, an instance of a video game title is defined as the version of the video game running locally on a client device, wherein said video game title is hosted on a remote server. That is, the client device is in communication with the remote server to execute a local version of the video game title hosted on the remote server.

The master game module 120 controls aspects of the game for all users and receives and processes each user's input in the game. In other words, the master game module 120 hosts the online game for all users, receives game data from the client devices 110 and transmits updates to all client devices 110 based on the received game data so that the game, on each of the client devices 110, represents the most updated or current status with reference to interactions of all users with the game. Thus, the master game module 120 transmits the game data over the network 115 to the client devices 110 for use by the game module 120' at the client devices 110 to provide local versions and current status of the game to the users.

On the client-side, each of the one or more client devices 110 implements the game module 120' that operates as a gaming application to provide a user with an interface between the user and the game. The game module 120' generates the interface to render a virtual environment, virtual space or virtual world associated with the game and enables the user to interact in the virtual environment to perform a plurality of game tasks and objectives. The game module 120' accesses game data received from the game server 110 to provide an accurate representation of the game to the user. The game module 120' captures and processes user inputs and interactions within the virtual environment and provides updates to the game server 110 over the network 115. In embodiments, the game module 120' captures and stores a plurality of statistical data or leaderboard data generated as a result of the user's interactions with the virtual environment of the game. The captured and stored leaderboard data is communicated back or uploaded to the game server 110 in real-time, periodically (such as through batch updates) during a game and/or at an end of the game.

In one embodiment, the gaming system 100 comprises a programmable clock (not shown) configured to generate a time-based trigger, which is used for synchronizing communication between the distributed video game servers and also between the servers and the remotely located client devices. In one embodiment, the communication between various components of the distributed gaming system 100 is facilitated by one or more game server interface call modules in data communication with the programmable clock. In one embodiment, each video game server is associated with an interface call module. The interface modules are configured to generate and transmit interface calls to one or more game servers based upon said time-based trigger, and are configured to receive game server data from the one or more game servers based upon the interface calls. As known in the art, interface calls provide a means for communication between components of a distributed system. The interface calls allow functions to be executed in a remote system or computing platform and provide a way for an external program to obtain data from a server.

In one embodiment, the game database system that stores a plurality of game data associated with one or more games hosted by the distributed video game servers is in data communication with one or more game server interface call modules, to allow external programs or modules to obtain requested data from a game server.

Video Game Content Aggregation Module 135

The present system further comprises a video game content aggregation module 135, which interfaces with the master game module 120 and the master leaderboard module 130 in the game servers to obtain game data for a plurality of games. In one embodiment, the aggregation module 135 communicates with the master game module 120 and the master leaderboard module 130 in the game servers to obtain game data from the associated database, by means of one or more interface call modules. In one embodiment, the aggregation module runs on one of the game servers 105, 106 from which it obtains game data. In another embodiment, the aggregation module is executed on a third party server or device 107, that is, on a device other than the server(s) providing game data. In one embodiment, the aggregation module runs on a dedicated server or computing device. In another embodiment, the aggregation module runs on a computing platform hosted on cloud.

Game data accessed by the aggregation module 135 may be broadly categorized into a first set of data referred to as game-rendering data and a second set of data referred to as leaderboard data. The game-rendering data is associated with rendering, execution or implementation of the online game to all users on their corresponding client devices. In embodiments, the game-rendering data comprises data such as, but not limited to:

a) data associated with the virtual environment or simulation space of the game. For example, audio-visual and/or graphics data and virtual objects, items or virtual elements data such as the various types, objectives and behaviors of virtual elements, objects, items and characters associated with the game;

b) game target data including data related to the current game targets, goals or objectives as well as data related to the past, present and future status of the targets, goals or objectives of the game;

c) data related to the users or players of the game. For example, user's identification data (such as a unique login or username and password), user's geographical location data (such as an IP address of the client device of the user), user's experience level or expertise with reference to playing the game, user's preferences, user-controlled virtual character or avatar and its permissible behaviors as well as customizations at various levels of the game, current number of users; and d) game identification data related to identification of an instance of the game being played by the users including the timestamp related to when a particular game instance was played by a particular user.

The leaderboard data is associated with a plurality of user related metrics, scoring or statistics and/or in-game event data generated as a result of the user's interactions with the virtual environment of the game. In embodiments, the leaderboard data comprises data such as, but not limited to:

a) data related to a plurality of scoring events that occur during a match. For example, high scores, kills or captures, fastest time periods to achieve certain scores, achievement of specific game levels and/or winning of specific matches by a set of 'N' number of top performing users, or ranking of the user with reference to the top 'N' users; and, b) data associated with in-game events such as, but not limited to, movement of the user throughout the virtual environment or topographical map of the game, interaction of the user's avatar with various virtual characters or elements in the game, virtual elements or items used and/or won, damage taken, perks acquired. It should be appreciated that the leaderboard data will vary depending upon the type, nature and objectives of the game and therefore encompasses any gameplay data relevant to and defined for a particular type of game and its objectives.

In the present specification, the leaderboard data may be referred to as a) client-side or user-specific leaderboard data generated and stored at a client device 110 (as a result of a user playing a game) and communicated back or uploaded to at least one game server 105, 106 or backend, and b) master leaderboard data stored at a game server or backend as a result of processing of leaderboard data received from all client devices of all users. The master leaderboard data is updated with client-side leaderboard data received from all client devices and therefore is representative of a comprehensive leaderboard data encompassing all that is or has happened as a result of an interaction of all the users with the virtual environment of a game.

After obtaining data from the master game module 120 and master leaderboard module 130 for a plurality of games played by a user, the aggregation module 135, in one embodiment, normalizes data across the plurality of games, to generate corresponding unified data for the plurality of games. As known in the art, normalization of statistical data, such as ratings, involves adjusting values measured on different scales to a notionally common scale, often prior to averaging. The normalization process applied by the aggregation module in the present specification allows data from one game to be fairly combined or compared with data from another game—comparisons which are not conventionally able to be made since data from the respective games have no unifying or common basis that would facilitate a valid comparison. Thus, for example, on obtaining data regarding ranking or levels achieved for a player who plays four different combat based games, the aggregation module may produce a single universal ranking or a unified level position applicable to all four games played by the player in the genre. Therefore, in an embodiment, the universal ranking is not game-dependent but rather is associated with the player and more representative of the player's overall gaming skill agnostic to any single specific game.

In some embodiments, the aggregation module 135 obtains data related to virtual objects and items associated with various games, and normalizes the data to achieve a unified item score, or value, for an item or a category of items. The unified item scores or values for virtual items or objects are used to enable fair trade between virtual items across different games.

Recommendation Module 140

The present system further comprises a recommendation module 140, which interfaces with the aggregation module 135 to obtain normalized data such as but not limited to, for example, universal ranking data reflecting a plurality of players' performance or expertise level across all games played in a genre and unified item scores, or values, for virtual items/objects or categories of virtual items/objects. In an embodiment, the recommendation module 140 is configured to use the normalized data to recommend a new game to a player based on the player's universal ranking and expertise level. In some embodiments, the new game may be from a genre within which the universal ranking has been generated by the aggregation module 135. In some embodiments, the new game may be from a different genre which is correlated or similar to the genre for which the universal ranking has been generated by the aggregation module 135. In another embodiment, the recommendation module 140 is configured to use the normalized data to recommend a second virtual item for trade based on a unified item value of a first virtual item owned by a player. In some embodiments, the first and second virtual items are associated with one or more video games in which the player is already registered. In some embodiments, the second virtual item is associated with a new video game that the player does not have or currently is not registered with or is currently not playing, thus incentivizing the player to both conduct a trade and engage in a new game.

In one embodiment, the recommendation module 140 communicates with the aggregation module 135 by means of one or more interface call modules. In one embodiment, the recommendation module runs on at least one of game servers 105, 106. In another embodiment, the recommendation module is executed on the server or device 107, that is, on the device executing the aggregation module 135. In one embodiment, the recommendation module runs on a dedicated server or computing device. In another embodiment, the recommendation module runs on a computing platform hosted on cloud.

Normalization Process

In an embodiment, the process of normalization, executed by the aggregation module, involves obtaining an average of data across all the games played, after taking into consideration the number of matches played for each. In other embodiments, the normalization process may involve making adjustments to data to bring the entire probability distributions of adjusted values into alignment. Other approaches to normalization may include aligning distributions of data to a normal distribution, and quantile normalization, where the quantiles of the different measures are brought into alignment.

The process of normalization may also involve creation of shifted and scaled versions of game statistics to allow the comparison of corresponding normalized values for different datasets in a way that eliminates the effects of certain gross influences or anomalies. Some types of normalization may involve rescaling, to arrive at values relative to some size variable. In one embodiment, the aggregation module determines the normalization process to be applied to the game server data, based upon a portion of the game server data. Thus, the method of normalization applied may be determined on the basis of the type of data available. One of ordinary skill in the art would appreciate that any method of normalization may be applied to the obtained game data, so long as it serves the purpose of combining or unifying data from various games in an equitable manner.

In an exemplary embodiment, a process of normalization may involve acquiring at least a plurality of performance data or metrics of a player for a game. The performance data may comprise any game data known to persons of ordinary skill in the art. For example, in a first-person shooter genre, the metrics may comprise, without limitation, kills per minute (KPM), kill/death ratio, win/loss ratio, the player's experience level, shot accuracy, and any other metric as applicable to the game genre. As another example, in a basketball game, the metrics may comprise, without limitation, the player's win/loss ratio, points per game, steals per game, assists per game, blocks per game, turnovers per game, three-point shooting percentage, and/or two-point shooting percentage, among other data. In a racing simulation, the metrics may comprise, without limitation, win/loss ratio, percentage of placements in the player's most recent races, time taken to complete various races, among other data. One of ordinary skill will recognize various metrics may used to determine a player's skill or ranking in a particular game.

In some embodiments, a numerical score is assigned to one or more metrics applicable to a player's skill or ranking within the game, wherein the score is on a common scale of, for example, 1 to 10. In some embodiments, a total score is obtained for the player for the game across all matches or sessions of that particular game played. In other embodiments, the total score is obtained based on a sample of the most recent matches or sessions played by the player (e.g., matches or sessions played within a certain time period such as the past 1, 3, 6 months or any other time period or the most recent 5, 10, 15 matches or sessions or any other number of matches or sessions). In some embodiments, the total score is based on matches or sessions played in a particular mode of the game (e.g., a ranked mode). This process may be repeated for one or more of the different games played by the player, for example all games played by the player, games within a particular genre, or some other subset of games played by the player. In some embodiments, the total scores corresponding to the different games played may be weighted depending upon a level of similarity or correlation of the games with a genre. In some embodiments, an internal weighted average score is calculated across the totality of games played by the player for the genre. In some embodiments, a universal average score is calculated for all games played, by a universe of players, relevant to the genre. In some embodiments, this universal average score is calculated using performance data obtained from external sources such as data accessed via game system APIs of third party games or by scraping websites of game developers available online or delivered via their game server(s). In some embodiments, the internal weighted average score of the player is compared with the universal average score to determine or predict a unified or overall ranking and skill level of the player for a game relevant to the genre.

In another exemplary embodiment, a process of normalization may involve obtaining a player's first average score for a plurality of matches of a first game associated with a genre. In an example, the genre may be a card game genre and the first game may be, without limitation, bridge. In some embodiments, depending upon the player's first average score and respective average scores of a plurality of other players (for the first game), a ranking is generated. Accordingly, in some embodiments, the player is accorded a first ranking on the first game of the genre. Similarly, the player's second average score is obtained for a plurality of matches of a second game associated with the genre. In an example, the second game may, without limitation, be whist (similar to spades or hearts). In some embodiments, depending upon the player's second average score and respective averages scores of a plurality of other players (for the second game), a ranking is generated. Accordingly, the player is accorded a second ranking on the second game of the genre. The same process may be repeated to obtain the player's ranking in a number of games associated with the genre.

Using the non-limiting example of obtaining first and second rankings of the player for the first and second games, in some embodiments, the first and second rankings of the player are aggregated, added or summed up to obtain a first aggregate ranking score of the player. For example, if the first and second rankings of the player are 2 and 3, respectively, then the first aggregate ranking score of the player is 2+3, which equals 5. First and second rankings are similarly obtained and summed up for each player who plays the first and the second games. Thus, a second player may have first and second rankings as 1 and 1, respectively, so the second player's aggregate ranking score would be 1+1, which equals 2. Accordingly, the third aggregate ranking score for a third player may be 7 (as an example, based on the sum of rankings as described above). Finally, in some embodiments, a universal ranking list is generated wherein all players are listed along with their aggregate scores. In some embodiments, the universal ranking list may be presented in a sorted fashion, such as by player handle name, an ascending order, or a descending order. If presented in ascending order, in the example above, the player with the second aggregate ranking score (2) will be on top, followed by the player with the first aggregate ranking score (5) and finally, followed by the player with the third aggregate ranking score (7). The universal ranking list indicates that the player with the second aggregate ranking score is the highest ranking player in the genre. In some embodiments, a universal ranking of, say, 1 is formally associated with the player of the second aggregate ranking score, a universal ranking of 2 is associated with the player of the first aggregate ranking score and a universal ranking of 3 is associated with the player of the third aggregate ranking score.

In one embodiment, after normalization, the aggregation module presents or publishes the unified results to the user by means of one or more GUIs (Graphical User Interface). In one embodiment, the GUIs for presenting the aggregated results are integrated with the GUI(s) of one or all of the games being played, for which the results are aggregated. In another embodiment, the aggregation module GUI is associated with a third party (outside of the games) website or application, from where users can access their unified data. In one embodiment, the third party app or website allows a user to create a profile and a login, such that each user may access their individual and unified game results across all the games they play. The GUI accesses updated or most current game data from the aggregation module and presents or displays the accessed data to the user.

In one embodiment, the system 100 further comprises a publication module (not shown) in data communication with the video game content aggregation module, wherein the publication module is configured to format and transmit the normalized video game content and data to a plurality of electronic addresses. That is, the publication module is responsible for converting the normalized data into suitable formats to be delivered by means of GUIs to various user devices.

As known to persons of ordinary skill in the art, there are several websites that track user results and statistics across several games. Examples of such game tracking websites include Codtracker.net, Destinytracker.com, Battlefieldtracker.com and Gametracker.com. However, the data displayed by these tracker sites is specific to a game. For example, in FPS games, the tracker sites would display rankings individually for games such as Call of Duty, Quake Live, or Battlefield Hardline. In contrast however, the present system collects distinct types of data from a game system and then normalizes the data to a set of standards that are specific to that game or genre of games to create an adjusted and weighted figure to normalize across multiple games. Thus, the present system would display an overall, normalized ranking that takes into account players' performance in all the FPS games played by them, which may include one or more of Call of Duty, Quake Live, Battlefield Hardline, or other games in the same genre.

FIG. 2 illustrates an exemplary GUI screen that displays aggregated results to a user. Referring to FIG. 2, GUI screen 200 shows a list of player or user names 201 and each user's corresponding scores in three games—Game A 202, Game B 203 and Game C 204. Alongside, the GUI screen also shows the 'overall rank' 205, which is the unified, normalized rank produced by the aggregation module of the present system. The GUI screen 200 further displays an 'overall level' 206 for each user, which is a normalized value for levels achieved by the user in the three games.

Figure 3:
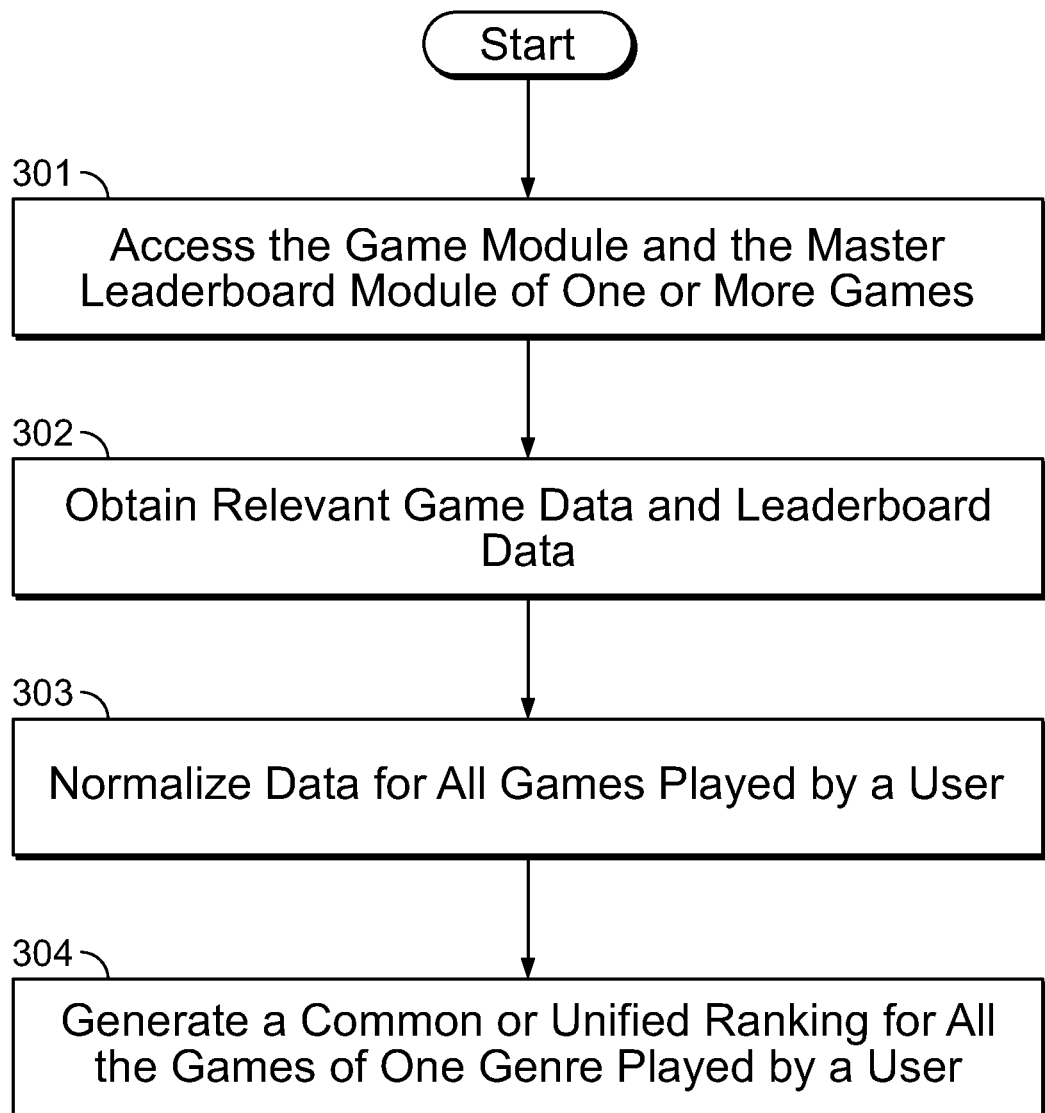
FIG. 3 is a flowchart illustrating a method of aggregating and normalizing data across different games to achieve unified data values, according to an embodiment of the present specification.

FIG. 3 is a flowchart illustrating the present method of aggregating and normalizing data across different games, to achieve unified data values. Referring to FIG. 3, in the first step 301 the aggregation module running on one of the game servers or another device in the gaming system, accesses the game module and the master leaderboard module of one or more games played by a user. In one embodiment, the access is secure and based on a suitable access security protocol, such as but not limited to public/private key authentication. In the next step 302, the aggregation module obtains relevant game data and leaderboard data. In embodiments, game and leaderboard data is obtained via game system APIs or the data may be scraped from websites of developers of the one or more games. In accordance with aspects of the present specification, as described above, a plurality of game data is communicated from the game module and leaderboard module to the aggregation module. In one embodiment, the data obtained by the aggregation module also includes information such as user ID, console or device ID on which the game was played, device OS details, game version, gameplay or match duration and timestamp, and the detailed statistics generated from the game play. In one embodiment, data provided to the aggregation module from the game module and master leaderboard module is encrypted, such that it can be decrypted only by the aggregation module. Exemplary algorithms that may be used to encrypt and/or sign information payloads before transmission from the leaderboard module or game module to the aggregation module include JOSE JWS Signing (HMAC using SHA-256 hash algorithm) and Public Key Encryption. It may be noted that any encryption methods known in the art may be employed for the purpose, so long as they serve the purpose of securing the data such that it cannot be tampered with and only accessed by an authorized aggregation module. In the next step, 303, the aggregation module normalizes data for all games played by a user using any of the methods for normalization described above. Preferably, the normalization process is performed for all games belonging to the same genre, that is, game data and results are grouped together genre-wise. Finally, in step 304, the aggregation module generates a common or unified ranking for all the games of one genre played by a user and transmits data indicative of the common or unified ranking to one or more user interfaces. In one embodiment, different common or unified rankings are generated for different genres of games played by a user, such genres including, but not limited to, squad-based FPS, FPS (First Person Shooter), TPS (Third Person Shooter), fighting games, real-time strategy games, platform games, survival games, RPG (Role-Playing Game), rhythm games, individual sports games, racing games, and tower defense games.

Ranking of Players

As described above, the present method and system allows ranking a player based on multiple games. Thus, for example, for a user who plays several first person shooter (FPS games), the present system generates an aggregate universal ranking reflecting the player's performance in all of the FPS games played by that player. The overall ranking not only helps users identify their strengths and compare themselves against other players, but also assists the gaming system in matching players of similar ranks or strengths, when users compete against each other in online multiplayer games or in e-sports competitions.

The present system of generating an overall ranking for a player on a genre-by-genre basis is also useful when a player starts playing a new game. For example, if a user downloads a new kind of card game, the gaming system associated with that new card game does not have data indicative of how that person will play in that particular game. However, if an overall ranking for the card games already played or being played by the user is available, the game system corresponding to the new game can import the player's overall ranking in card games and, based on the player's performance in games already played, can put the player at a suitable level to start the game and not necessarily at the beginner level. In this manner, the player does not have to build up performance data from scratch to be placed at an appropriate skill level in a game.

In embodiments, the publication module formats and displays normalized video game content and performance data as webpages on a website. In some embodiments, the data on the website is accessible for free (without charge) while in other embodiments, the data is accessible for a fee. In some embodiments, a third party game system may include functionality that enables a user to input her username or identification information and a URL or pointer to the website. Based on the input, the third party game system may access the user's normalized data from the website. In some embodiments, the website may issue a digital certificate to the user, comprising at least user identification information and a pointer to the website's back-end database system. The digital certificate may be issued either at no charge or for a fee. In some embodiments, the third party game system may enable the user to input their digital certificate, based on which the third party game system may access the user's normalized data. In other embodiments, the third party game system may automatically scrape the website for the user's data.

In embodiments, a player's performance or game play data is accessed from the game servers 105, 106 (FIG. 1), game system APIs of third party card games that allow such data to be accessed, and/or by scraping websites of developers or public blockchain records. The system of the present specification scans web sites and/or public blockchain records for specific phrases and data sets, copies the data and imports or enters the data into the database systems of the present specification.

In some embodiments, where a player's performance or game play data for a particular new game, such as the card game, is not available from internal and/or external sources the system of the present specification may scan internal data (that is, data present on servers 105, 106 of the system 100) for the player's relevant performance data in other games within the genre of the card game or within related genre(s). In some embodiments, the internal data may comprise data that is modified using correlation between genres. Thus, the degree of similarity between genres may be employed to gather internal data related to a player's performance. For example, a trading card game may correlate more closely with a strategy game than with a fighting game. Similarly, a sports game may correlate more closely with each other (unrelated sports), multi-player online battle arena games (MOBAs), and fighting games. In addition, games within the vehicle simulation genre may also correlate more closely with one another than they do with FPS games, for example. Next, the system may scan external data (that is, data accessed via game system APIs of third party card games, or by scraping websites of developers or public blockchain records) for the player's performance within the genre of the card game or within related genre(s). Thereafter, the system normalizes the data to generate the player's prediction score (that is, the score that predicts the player's estimated level of performance for the card game, for example). The prediction score is converted to a corresponding Elo ranking/level for the card game (the new game). The system may match the player with other players at that Elo ranking/level.

Figure 5:
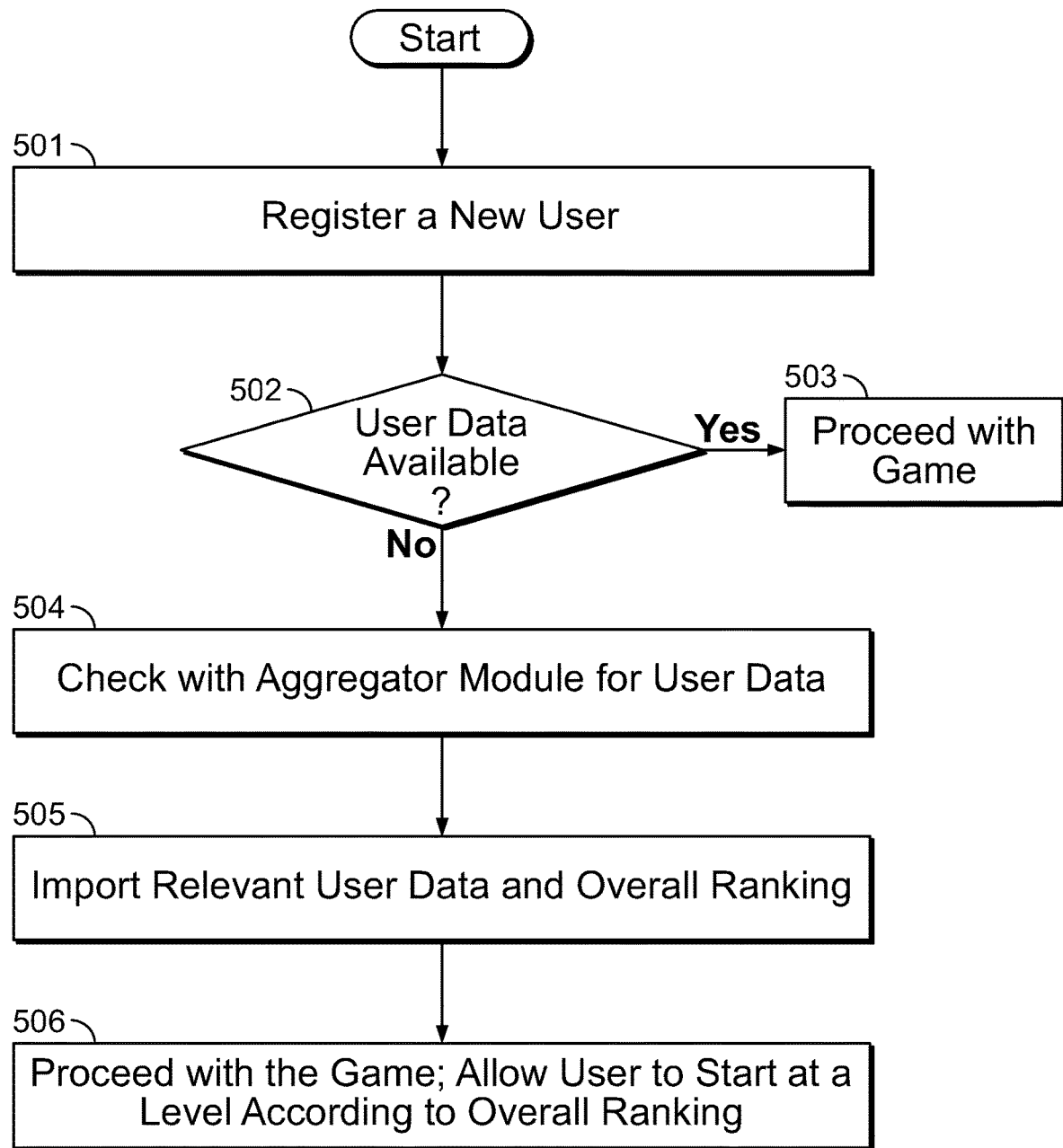
FIG. 5 is a flowchart illustrating the method of implementation of an embodiment of the present specification which allows game systems to access user rankings.

The method of implementation of the above embodiment is illustrated by means of a flowchart in FIG. 5. Referring to FIG. 5, in the first step 501, a user downloads a new game and is registered with the gaming system associated with the new game. In the next step 502, the gaming system checks if it has data related to the user's game play. If data for that user is available with the gaming system, it proceeds in accordance with the rules of the game, as shown in step 503. If however, the gaming system has no data associated with the user available, the server of the gaming system communicates with the aggregation module of the present specification to check if any game play data for that user is available. This is shown in step 504. If the desired data is available, the game server imports data from the aggregation module, as shown in step 505. The imported data may include game play performance statistics and overall ranking of the user with respect to other games of the same genre. The game system then proceeds in accordance with the rules of the game, and may optionally allow the user to start playing the new game at a game level in line with the user's overall ranking. This is shown in step 506.

To facilitate communication of various game servers with the aggregation module, in one embodiment the aggregation module is equipped with a system call interface which intercepts function calls coming in from various game servers and invokes the necessary system call within the aggregation module to allow a game server to access the required data. In another embodiment, video game servers may make use of interface call modules (described earlier in the specification) to communicate with the aggregation module. In one embodiment, the call interface is available only to authorized gaming systems. In one embodiment, only gaming systems or servers which subscribe to the present system of data aggregation and generation of unified rankings are authorized to access data from the aggregation module via interface call mechanisms. In one embodiment, data is supplied by the aggregator module to the game servers requesting the data, for a charge or payment.

In one embodiment, the overall ranking generated may be used to predict how a player will perform in a yet unknown game. In one aspect of the present specification, the present system automatically interfaces with game system APIs to extract relevant data and produce a new updated ranking for a player, which is applicable to a plurality of games played by the same player. In one embodiment, the present system employs suitable data scraping techniques, which enable the aggregation module to extract data from game system modules.

In one embodiment, the game and match results obtained by the aggregation module are stored using a decentralized and distributed method and system, such as a blockchain. As known in the art, a blockchain is a continuously growing list of records, called blocks, which are linked and secured using cryptography. Each block typically contains a hash pointer as a link to a previous block, a timestamp and transaction data. By design, blockchains are inherently resistant to modification of the data. A blockchain is typically managed by a peer-to-peer network collectively adhering to a protocol for validating new blocks. Once recorded, the data in any given block cannot be altered retroactively without the alteration of all subsequent blocks, which needs a collusion of the network majority. Since blockchains are secure by design and based on a distributed computing system, it is suitable for storing match and game data for a large number of players who play a variety of games. In one embodiment, the system of the present specification applies data scraping techniques to blockchain storage, to extract game data for processing and normalization.

It may be appreciated that the system and method of present specification may have several applications for video game makers and organizers of competitive video gaming events or e-sports events. In one application, the present system may be used as an effective means to scout general talent in a given genre of sports. For example, if a live competitive gaming event for an FPS game, such as 'Call of Duty' is being organized, the organizers may invite players having top overall rankings in the FPS games category to participate in the event. The overall ranking is based on aggregated play results of all the games played by a player, and may be obtained from the user interface or GUI associated with the present system, as described earlier in the specification.

Figure 6:
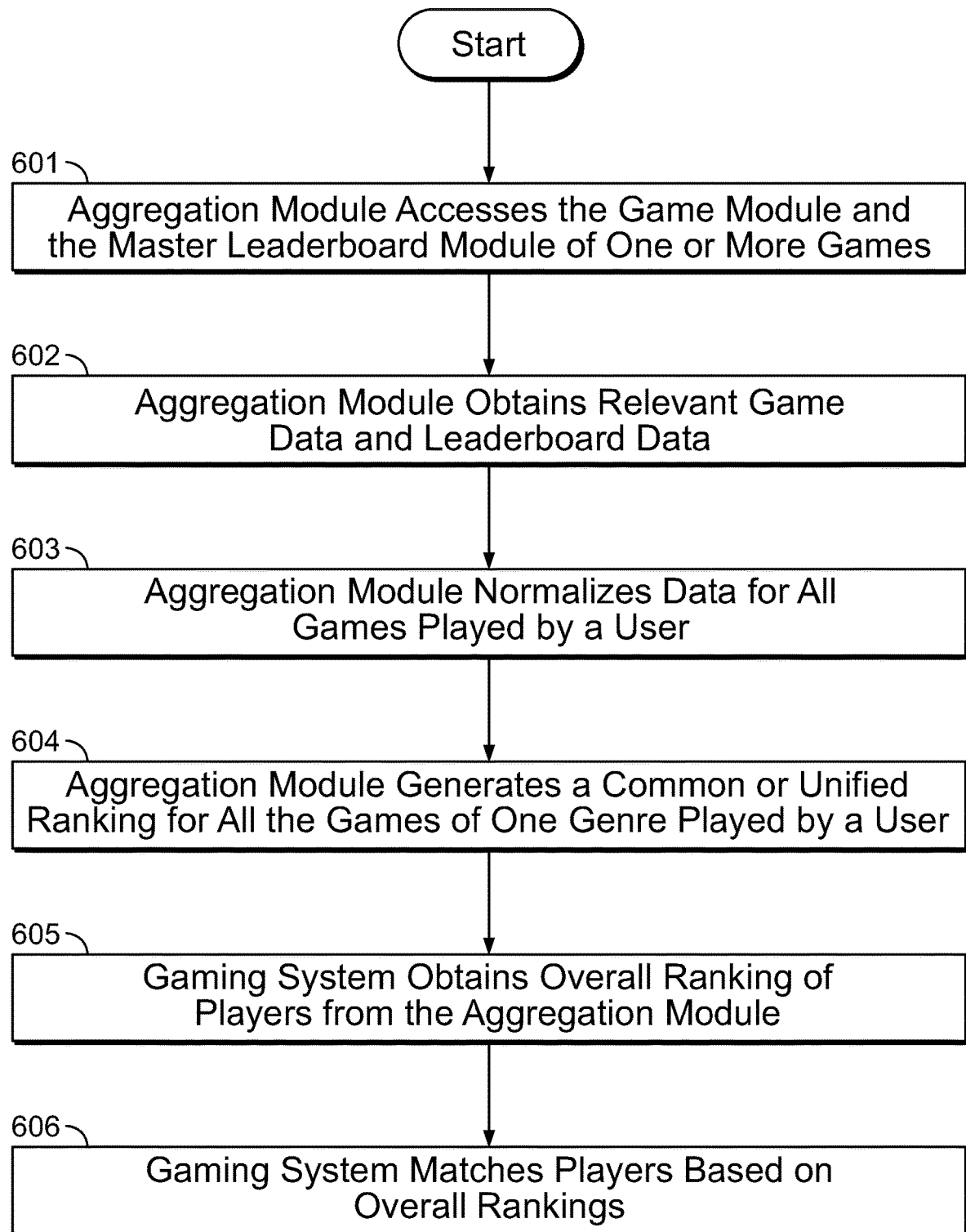
FIG. 6 is a flowchart illustrating a method of matching players, according to one embodiment of the present specification.

In another application, the overall ranking generated by the present system may be used to match players for playing matches in online multiplayer games, or in live video gaming competitions. This would avoid players with vastly varying skill, expertise or experience to be pitched together for matches. FIG. 6 is a flowchart illustrating an exemplary method of implementing player matching in an embodiment of the system of the present specification. Referring to FIG. 6, in the first step 601, the aggregation module running on one of the game servers or another device within the gaming system, accesses the game module and the master leaderboard module of one or more games played by a user. In the next step 602, the aggregation module obtains relevant game data and leaderboard data. In accordance with aspects of the present specification, the obtained data includes detailed statistics generated from the game play. In the next step, 603, the aggregation module normalizes data for all games played by a user using any of the methods for normalization described above. Preferably, the normalization process is performed for all games belonging to the same genre, that is, game data and results are grouped together genre-wise. In step 604, the aggregation module generates a common or unified ranking for all the games of one genre played by a user and transmits data indicative of the common or unified ranking to one or more user interfaces. In one embodiment, different common or unified rankings are generated for different genres of games played by a user. In the next step 605, unified ranking data is obtained by the game server of the gaming system, which desires to make use of the data to match players for playing matches. The system comprises a matchmaker module, wherein the matchmaker module is configured to obtain the unified ranking data from the aggregation module by means of interface call mechanisms, as explained above. In the next step 606, the matchmaker module uses the overall ranking of players to match players of similar ranking for playing matches of the game. Alternatively, in another embodiment (not shown), the aggregation module itself produces player matches for each game based on the players' unified overall ranking in that game or genre of games. A gaming system then simply obtains this player matching data from the aggregation module. In yet another embodiment, video game makers may use the data and results generated by the present system for skill-based marketing or targeted advertising. For example, if a player who plays FPS games has a certain rank or level, certain advertisements for other games of the same or related genre which require a similar level of skill for playing may be pushed to that player. The advertisements may be delivered in-game when the user is playing a game, or online via some other website or app. Similarly, advertisements for merchandise related to games in which a user is doing well and/or has been playing for a certain length of time may be shown to the user. As another example, data regarding rank or level of users in certain categories of games may be used to select users for targeted marketing of virtual objects associated with one or more games, such as tools, weapons, assets, reward packs, accessories, items and supplies, which the user may purchase to achieve better performance and higher levels in one or more games.

Figure 9:
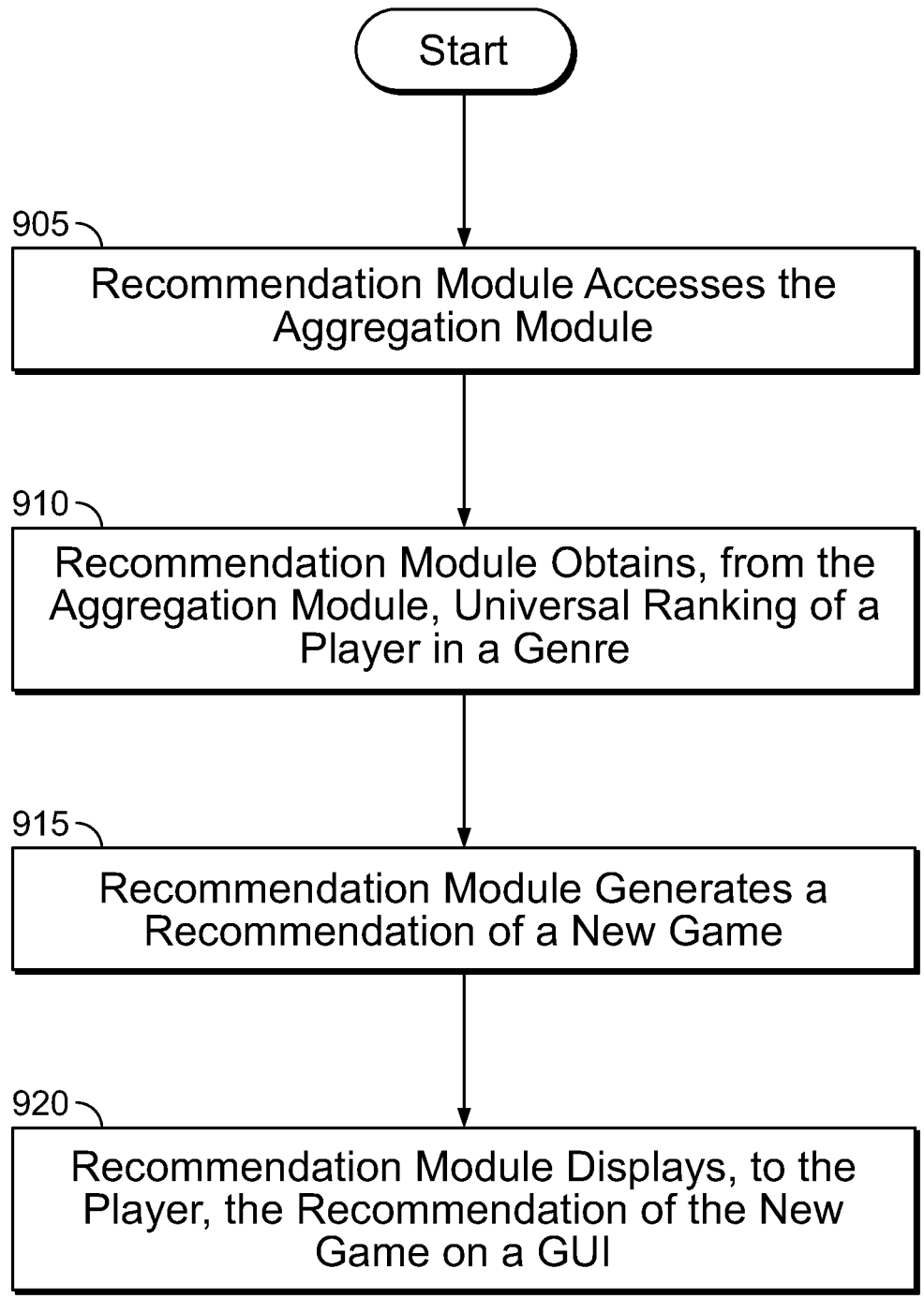
FIG. 9 is a flowchart illustrating a method of generating recommendations for a new game, based on a player's universal ranking or expertise level, in accordance with an embodiment of the present specification; and, FIG. 10 is a flowchart illustrating a method of generating recommendations for trading virtual items within a game or between games, based on a unified value of a first virtual item, in accordance with an embodiment of the present specification.

FIG. 9 is a flowchart illustrating a method for generating recommendations for a new game to a player, based on that player's universal ranking or expertise level, in accordance with an embodiment of the present specification. At step 905, the recommendation module accesses normalized video game content and/or data and, at step 910, obtains (from the aggregation module) a universal ranking of a player in a genre. At step 915, the recommendation module generates a recommendation for a new game for the player based on that player's universal ranking. In some embodiments, the new game may be from the same genre for which the universal ranking has been received from the aggregation module. In some embodiments, the new game may be from a different genre which is similar to or correlated with the genre for which the universal ranking has been received from the aggregation module. Finally, at step 920, the recommendation module displays or presents, to the player, the recommendation of the new game on a GUI.

Valuation of Items and Virtual Trading

In another embodiment, the method and system of the present specification may be used to implement a virtual trading system between different games. A virtual trading system would allow for trading of virtual objects associated with one or more games, between players in different games. Thus for example if Player A and Player B both play the games "Call of Duty" and "Destiny", then Player A may be able to exchange one of their "Call of Duty" weapons with one of Player B's items from Destiny. Virtual objects or items available for trade between users across different games may include tools, weapons, assets, reward packs, supplies, accessories and any other items associated with the corresponding games. For example, virtual items may include hand-held weapons such as, but not limited to, handguns, shotguns, assault rifles, sniper rifles, launchers, light machine guns, grenades, axes, knives, and bombs; defensive items such as, but not limited to armor and shields; attachments such as, but not limited to, sights, scopes, scanners and variable zooms; vehicles such as, but not limited to helicopters, airplanes, ground-vehicles and drones; emplaced weapons; additional characters, team members, squad members, or reinforcements; gadgets such as, but not limited to, optical camouflage, ammunition, binoculars, and sensors; equipment such as, but not limited to, uniforms, exoskeleton and medical kits. It should be appreciated that the type of virtual items will depend upon the genre of the game and therefore the above list of virtual items is only exemplary and in no way limiting.

To facilitate trade between virtual items across different games, in one embodiment, the aggregation module of the present system (as shown and explained with reference to FIG. 1) obtains data related to virtual objects and items associated with various games, and normalizes the data to achieve a unified score, or value, for an item or a category of items. This is used to ensure fair trade, such that only items of similar score or ranking may be traded. It further serves to educate users on what an objective value for their item, relative to other items in other games for which they may not be familiar, would be, thereby facilitating trade.

In one embodiment, the valuation of items is based on a plurality of factors, such as an item's rarity—that is, whether the item is common, rare, exotic, epic, or legendary; the percentage of users who have the item; the cost of purchasing the item using virtual game currency or other in-game objects; the level at which the item is available for purchase or as a reward; whether the item is achieved only as a reward after winning a certain number of matches; and any other factors in line with the rules and environment of the games under consideration.

Figure 4:
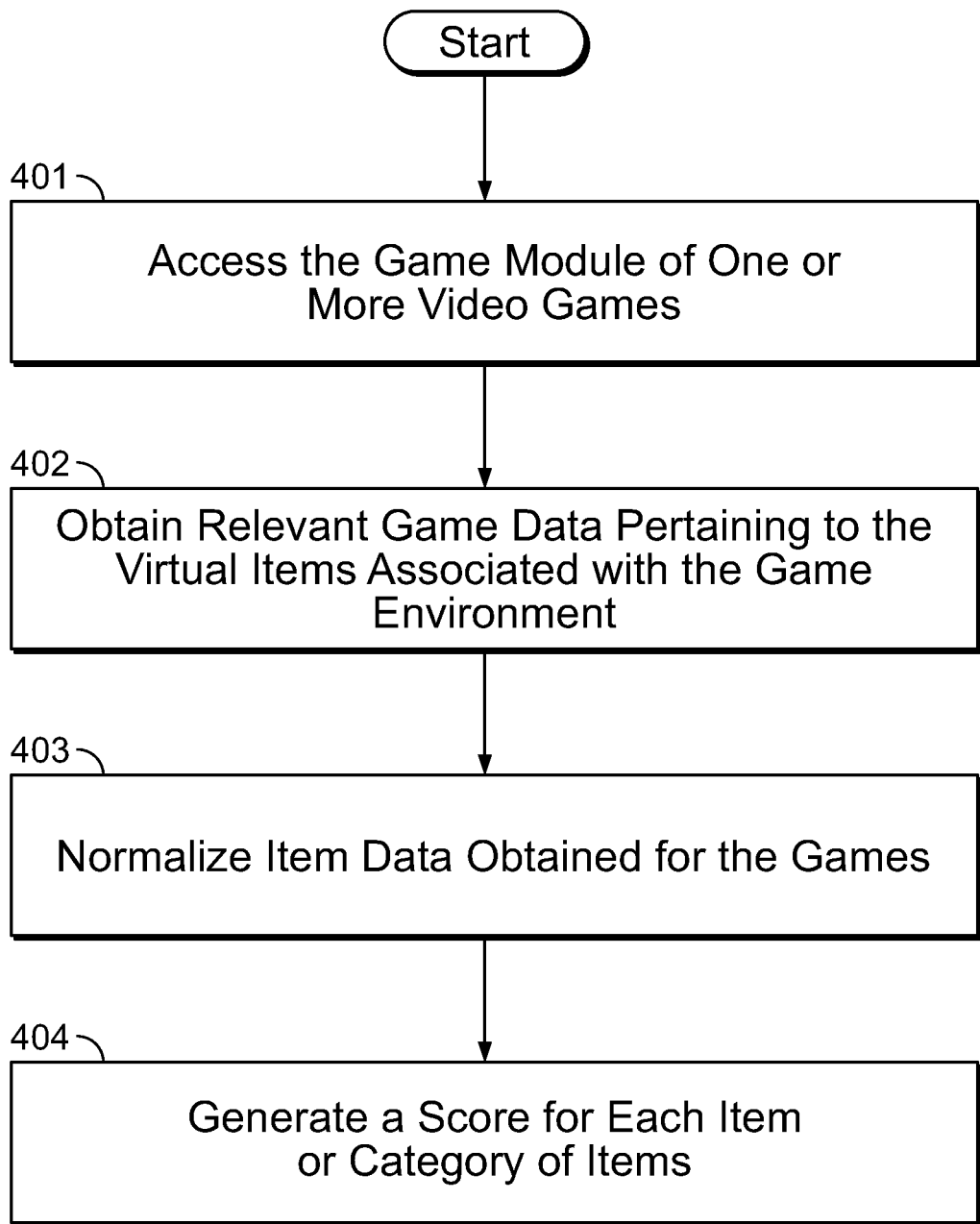
FIG. 4 is a flowchart illustrating the method of aggregating and normalizing data across different games, to achieve unified score or ranking for various items associated with the games.

FIG. 4 is a flowchart illustrating the method of aggregating and normalizing data across different games, to achieve a unified score or ranking for various items associated with the games. Referring to FIG. 4 in conjunction with FIG. 1, in the first step 401 the aggregation module 135 running on one of the game servers or another device in the gaming system, accesses the game module of one or more games played by a user. In one embodiment, the access is secure and based on a suitable access security protocol, such as public/private key authentication. In the next step 402, the aggregation module obtains relevant game data pertaining to the virtual items associated with the game environment that can be traded. Preferably, the data obtained by the aggregation module also includes information such as user ID, console or device ID on which the game was played, device OS details, game version, gameplay or match duration and timestamp, and the detailed statistics generated from the game play. In one embodiment, data provided to the aggregation module from the game module is encrypted, such that it can be decrypted only by the aggregation module. Exemplary algorithms that may be used to encrypt and/or sign information payloads before transmission from the leaderboard module or game module to the aggregation module include JOSE JWS Signing (HMAC using SHA-256 hash algorithm) and Public Key Encryption. It may be noted that any encryption methods known in the art may be employed for the purpose, so long as they serve the purpose of securing the data such that it cannot be tampered with.

In the next step, 403, the aggregation module normalizes item data obtained for all the games using any of the methods for normalization described above. In one embodiment, the normalization process is performed for all the items belonging to the same genre or category. That is, item data are grouped together category-wise, or genre-wise, before normalization. The categories may be based on item rarity, percentage of users having the item, and other factors as described previously. The process of normalization involves adjusting values measured on different scales to a notionally common scale. The normalization process applied by the aggregation module in the present specification allows virtual items from one game to be fairly compared with virtual items from another game.

Finally, in step 404, the aggregation module generates a score for each item and/or category of items, such that different items across different games may be fairly compared and traded. It may be understood that the generated score reflects the value of each item, which in turn is based on a plurality of factors, some of which have been delineated above—such as an item's rarity, cost of the item in terms of virtual game currency or other in-game objects, level at which the item is available, reward value of item, and any other factors in line with the rules and environment of the games under consideration.

By way of example, in an embodiment, item data is categorized based on factors such as, but not limited to, percentage of users having the item, item rarity, power level, damage per second (DPS) associated with the item, microtransaction (MTX) cost associated with the item, cost of the item in terms of virtual game currency or other in-game objects, level at which the item is available and reward value of the item. Thereafter, the item is given a score, for each relevant factor, on a common scale such as a scale of 1 to 10. In some embodiments, the scores attributed to certain factors such as, for example, rarity level and the in-game currency cost are given higher weights compared to the scores of other factors. Finally, a weighted average of the scores across all relevant factors is calculated to assign or determine a unified trade value or score of the item.

In one embodiment, after normalization, the unified item scores are presented to the user by means of one or more GUIs (Graphical User Interface). In one embodiment, the GUIs for presenting the normalized item scores are integrated with the GUI(s) of one or all of the games being played, for which the item data is aggregated and normalized. In one embodiment, the same GUI is also used to trade items with other users. In another embodiment, the GUI is associated with a third party (outside of the games) website or application, from where users can access unified game-wise item scores and trade items. In one embodiment, the third party app or website allows a user to create a profile and a login, such that each user may access scores for all the items they possess, across all the games they play. The GUI accesses updated or most current game data from the aggregation module and presents or displays the accessed data to the user. Thus, in one embodiment, the GUI acts as a "universal vault" or cross game inventory, from where users can see the value or score associated with their game items, across all the games they play.

As mentioned above, the same GUI may be used to view items scores, as well as to trade items. The trade may be facilitated through in-game software in one embodiment, or via an external app, console lobby software, or website. In one embodiment, the trading experience is presented by the GUI to a user in such a manner that it appears that the users are trading directly. However, the accounting and corresponding addition or deletion of items to a game environment following a trade is done on the back end or game server. For example, the GUI may enable a first player to input an offer exchange of a first item in lieu of a second item. The offer of the first player along with his identification/username may either be displayed or broadcasted on the GUI for visualization by all other users and/or the first player may specifically communicate his offer to a second player that is likely to be in possession of the second item. If a player, such as the second player, accepts the first player's offer the back-end system deletes the first item from an account of the first player and adds the first item to the second player's account. Simultaneously, the system deletes the second item from the second player's account and adds the second item to the account of the first player.

Figure 7A:
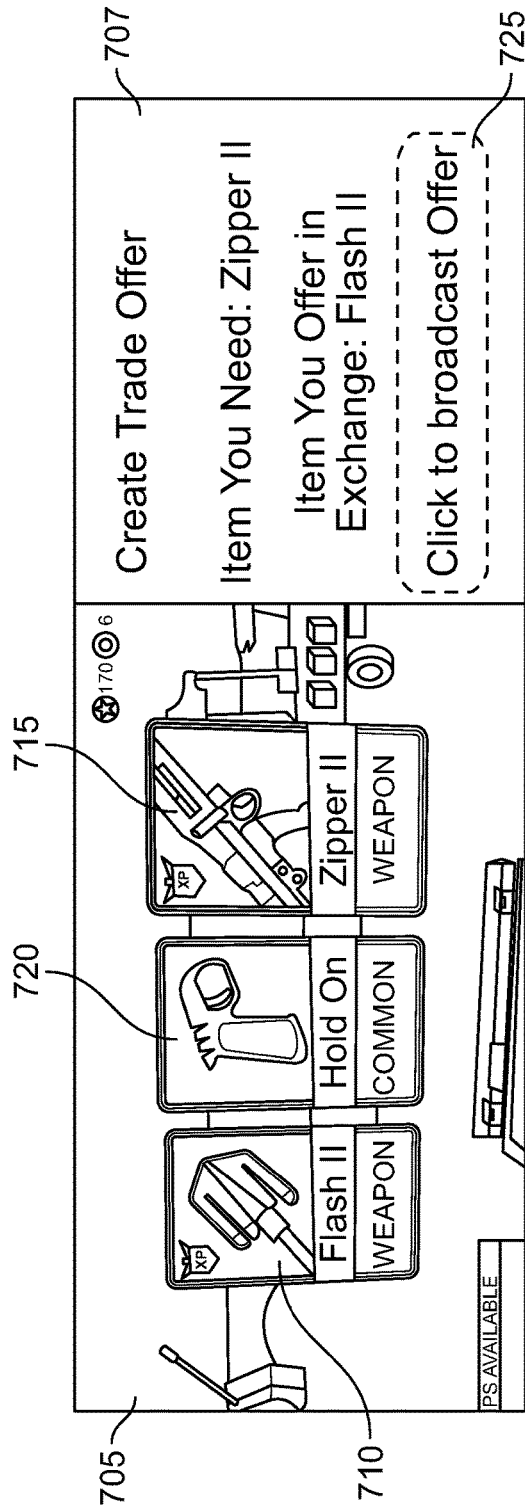
FIG. 7A is a GUI of a first user generating a trade offer with reference to virtual items, according to one embodiment of the present specification.
Figure 7B:
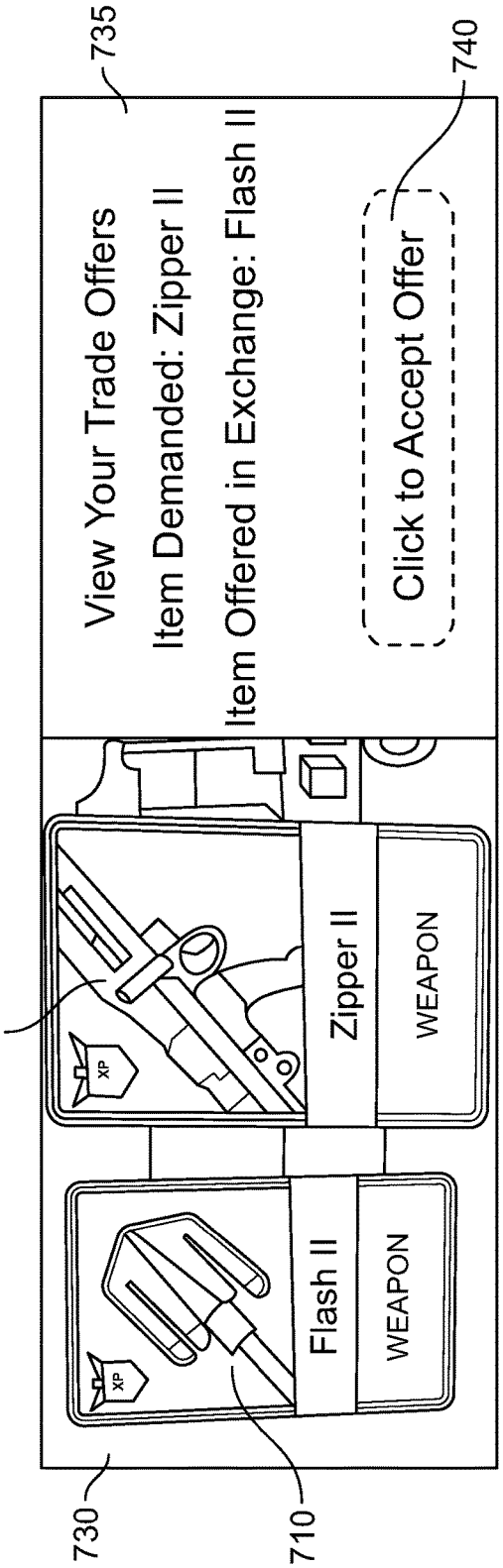
FIG. 7B is a GUI of a second user receiving the trade offer generated in FIG. 7A, according to one embodiment of the present specification.

FIGS. 7A and 7B are exemplary GUIs showing and enabling trading of normalized virtual items, in accordance with an embodiment of the present specification. FIG. 7A shows GUI 705 of a first user who wishes to offer a first item 710 in exchange for a second item 715. The GUI 705 presents the first user with the first and second items 710, 715 along with a third item 720. In an embodiment, items 710, 715 and 720 are normalized items (items that have been normalized such that they are considered of equal trading value) and eligible for trade with one another. Accordingly, the first user's trade offer is generated in screen area 707. In some embodiments, if the first user clicks button 725, the trade offer is broadcasted automatically to at least one second user in possession of the second item 715. In some embodiments, the first user may specifically choose one or more users to whom the first user would like to send the trade offer. FIG. 7B shows GUI 730 of the second user who receives the trade offer in his screen area 735. The GUI 730 also presents the first and second items 710, 715 that are part of the trade offer. On clicking button 740, the second user may accept the trade offer. Conversely, the second user may decline the offer by clicking another button or simply ignore the offer. Based on the second user's acceptance of the offer, the back-end system deletes the first item from the first user's account and adds it to the second user's account. Simultaneously, the second item is deleted from the second user's account and added to the first user's account.

In one embodiment, the cross-game virtual trading system of the present specification allows players to convert their items in one game into some value in the next game they plan to play. For example, if Player A plans to start playing a game "Destiny 2", he or she can trade virtual items from the current game they are playing for items relevant to Destiny 2. This would give the player an initial advantage when they start playing Destiny 2, as they will have to play less number of matches (or no matches) to obtain the same game items, compared to another player who starts playing Destiny 2 from scratch. This would further help Player A achieve match targets and game levels more quickly.

In one embodiment, the video game company may charge a transactional fee for trading items between games. This charge may be facilitated through the game GUI in the same manner as in-game purchases are made. In one embodiment, trading GUI is merged with the in-game GUI. In another embodiment, the game GUI communicates with the trading GUI, the latter being a separate entity and/or hosted via a separate app, website or server.

In one embodiment, the game GUI in conjunction with the trading GUI provides proactive notifications to the user on their device to facilitate item trade. For example, if a user has collected multiple items of same category—such as weapons of a given rarity, the game GUI may prompt the user to trade some of those items. In one embodiment, the trading GUI provides notifications and updates regarding scores of the items acquired in game by a user from time to time. In one embodiment, the GUI notifications also suggest trade options or deals for trading the items in possession of a user. For example, the GUI may suggest that a user trade an item they have not used in a long time. The GUI may also suggest an item to acquire based on the current playing level of the user in a game, and may provide notifications if items of interest are available for trade by other users.

In another embodiment, the game or trading GUI enables a user to trade their items at even value, when the user wants to quit a first game (game A) and start playing another game (game B). In this case, the GUI may allow the user to give up their items in game A for items of corresponding value of game B.

Figure 8:
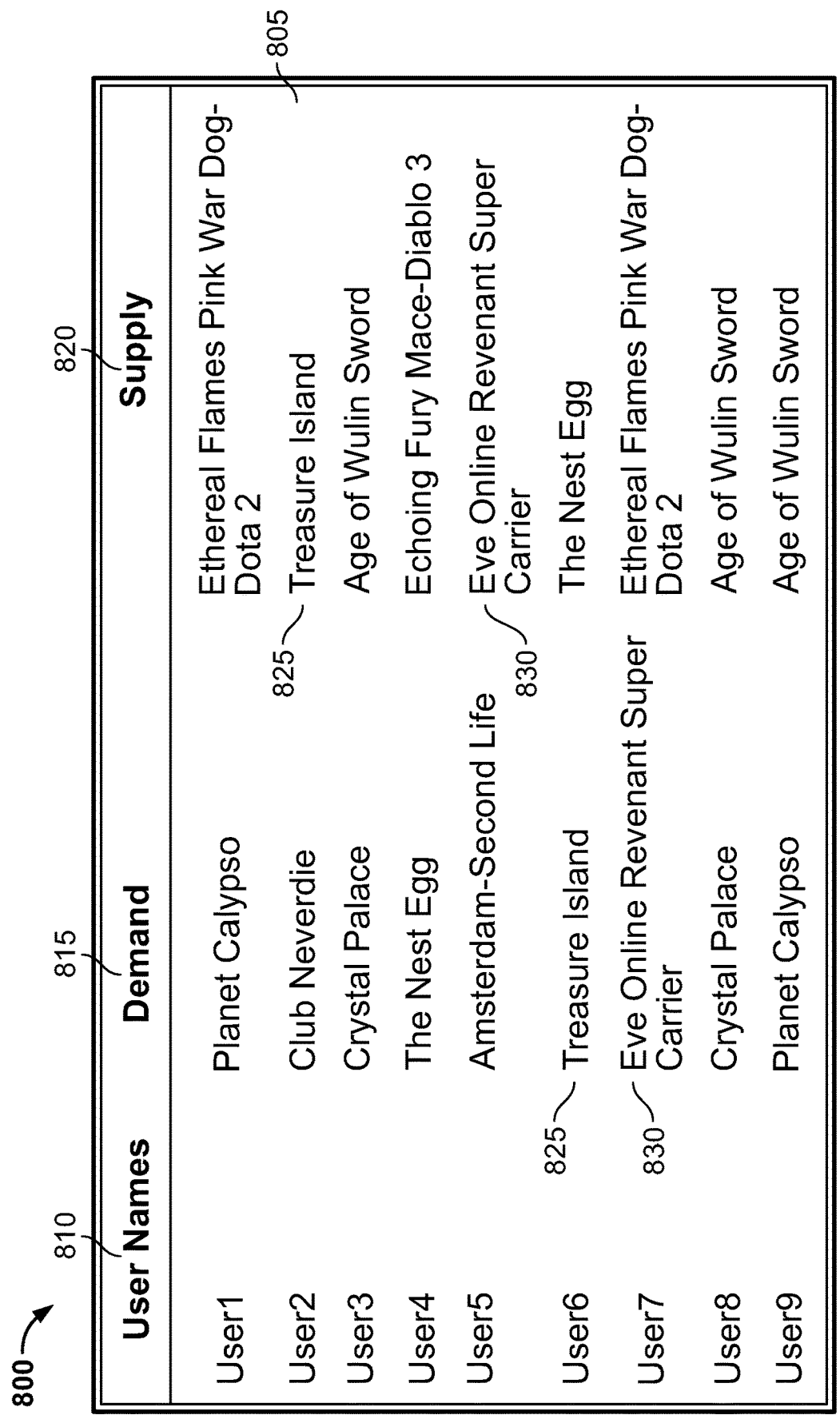
FIG. 8 is a screenshot of an exemplary cross-game virtual trading marketplace, according to one embodiment of the present specification.

In one embodiment, the GUI facilitates the purchase of an item that a user is in search of, by matching with users who have that item and want to trade it for some other item. In one embodiment, the cross-game virtual trading system of the present specification allows two users to directly connect with each other and agree on trading items. In one embodiment, the GUI of the system is also integrated with a chat or messaging interface that allows users to communicate with each other. In another embodiment, or the cross game virtual trading system of the present specification functions as a marketplace, where a user wishing to trade an item or a user wishing to acquire an item can enlist their requirement. The system then matches users based on supply and demand of items for trade and allows them to communicate with each other. FIG. 8 is a screenshot of an exemplary cross-game virtual trading marketplace 800, in accordance with an embodiment. As shown a listing 805 provides a plurality of users 810 along with their respective demand virtual items 815 (items required by the users) as well as supply virtual items 820 (items available for exchange or supply from the users). In the present embodiment, the back-end system automatically identifies and matches users based on supply and demand of items. For example, a demand of user6 for item 825 is matched with a supply of the item 825 from user2. Similarly, a demand of user7 for item 830 is matched with a supply of the item 830 from user5.

Figure 10:
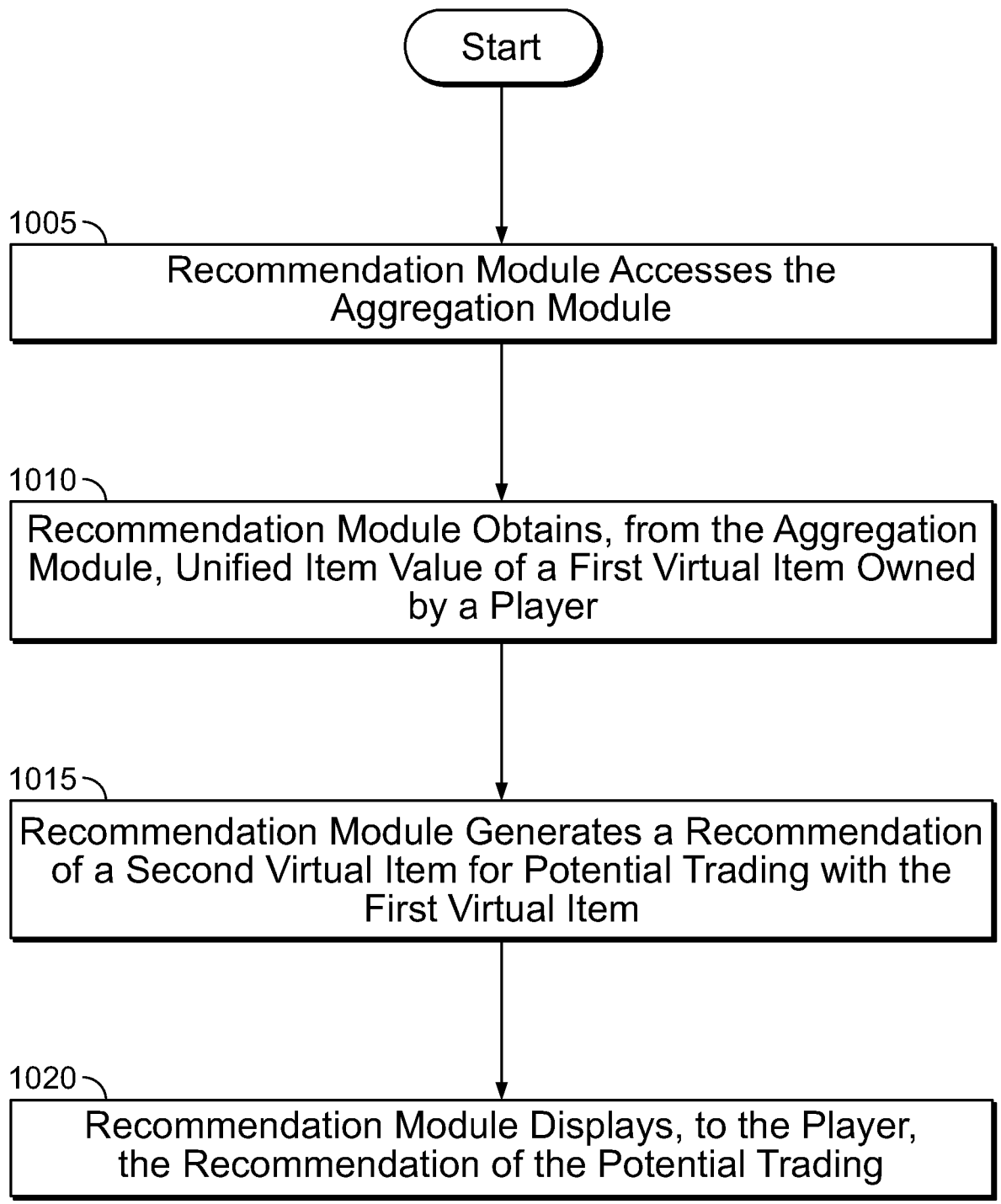

FIG. 10 is a flowchart illustrating a method of generating recommendations for trading a virtual item, based on a unified value of another virtual item owned by a player, in accordance with an embodiment of the present specification. At step 1005, the recommendation module accesses normalized video game content and/or data and, at step 1010, obtains (from the aggregation module) a unified or uniform item value of a first virtual item possessed by a player corresponding to a game in a genre. At step 1015, the recommendation module generates a recommendation of a second virtual item, based on the unified item value of the first virtual item, for potential trading with the first virtual item. In some embodiments, the first and second virtual items are associated with one or more video games in which the player is already registered as a player. In some embodiments, the second virtual item is associated with a new video game that the player does not have or currently is not registered with for play. In some embodiments, the new video game is of the same genre as that of the game corresponding to the first virtual item. In some embodiments, the new video game is of a genre different from that of (yet similar to or correlated with) the game corresponding to the first virtual item. Finally, at step 1020, the recommendation module displays, to the player, the recommendation of the potential trade offer involving the first and second virtual items, on a GUI.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method for managing virtual items associated with game environments generated by a plurality of different video games, wherein each of the plurality of different video games is executed by at least one game server and rendered on at least one of a plurality of client devices, the method comprising:
   accessing data generated by each of the plurality of different video games, wherein the data comprises information about the virtual items;
   storing the data;
   normalizing the data such that a value of each of the virtual items can be compared to each other, wherein each of the virtual items is defined by at least one of a rarity of the virtual item, a percentage of video game players possessing the virtual item, a cost of purchasing the virtual item, a gaming level at which the virtual item is available for purchase, or an availability of the virtual item as a reward and wherein the normalizing comprises:
      grouping the data based on at least one of said rarity, said percentage of video game players possessing the virtual item, the cost of purchasing the virtual item, the gaming level at which the virtual item is available for purchase, or the availability of the virtual item as a reward;
      assigning one or more scores based upon said grouping; and
      obtaining a normalized value of each of the virtual items as a function of each of the assigned one or more scores; and
   generating data representative of a user interface, wherein the user interface is configured to allow multiple users to trade the virtual items based on the normalized values of the virtual items.

2. The method of claim 1, wherein the grouping is based on at least two of said rarity, said percentage of video game players possessing the virtual item, the cost of purchasing the virtual item, the gaming level at which the virtual item is available for purchase, or the availability of the virtual item as a reward.

3. The method of claim 1, wherein the grouping is further based on a genre of each of the plurality of different video games.

4. The method of claim 1, wherein each of the plurality of different video games belong to a different genre.

5. The method of claim 1, wherein accessing the data comprises acquiring the data from the at least one game server.

6. The method of claim 1, wherein accessing the data comprises acquiring the data from the database.

7. The method of claim 1, wherein normalizing the data comprises assessing the value of each of the virtual items based, at least in part, on its rarity.

8. The method of claim 1, wherein normalizing the data comprises assessing the value of each virtual item based, at least in part, on the percentage of users who have the virtual item.

9. The method of claim 1, wherein normalizing the data comprises assessing the value of each virtual item based, at least in part, on the cost of purchasing the virtual item.

10. The method of claim 1, wherein normalizing the data comprises assessing the value of each virtual item based, at least in part, on the level at which the virtual item is available for purchase or as the reward to the player.

11. The method of claim 1, further comprising using a recommendation module to recommend the virtual item for trade based on the value of the virtual item.

12. A system for managing virtual items associated with game environments generated by a plurality of different video games, each of the plurality of different video games being executed by a plurality of game servers and rendered on a plurality of client devices, said plurality of game servers being in communication with a database, the system comprising:
   one or more game server interface call modules, wherein the one or more game server interface call modules are configured to generate and transmit interface calls to the plurality of game servers and are configured to receive data from the plurality of game servers based upon the interface calls and wherein the data comprises information about the virtual items;
   said database in data communication with the one or more game server interface call modules, wherein the database is configured to receive and store the data;
   a video game content aggregation module in data communication with the database, wherein the video game content aggregation module is configured to acquire data from the database, determine a normalization process to be applied to the data based upon at least one of a rarity of the virtual item, a percentage of video game players possessing the virtual item, a cost of purchasing the virtual item, a gaming level at which the virtual item is available for purchase, or an availability of the virtual item as a reward, and to apply the determined normalization process to the portion of the game data such that a value of a virtual item from one of the plurality of different video games can be compared with a value of a virtual item from another one of the plurality of different video games; and
   a publication module in data communication with the video game content aggregation module, wherein the publication module is configured to generate data representative of a user interface, wherein the user interface is configured to enable with multiple users to concurrently trade virtual items from different ones of the plurality of different video games based on the normalized values of said virtual items.

13. The system of claim 12, wherein the normalization process to be applied to the data is based upon at least two of said rarity, said percentage of video game players possessing the virtual item, the cost of purchasing the virtual item, the gaming level at which the virtual item is available for purchase, or the availability of the virtual item as a reward.

14. The system of claim 12, wherein the normalization process to be applied to the data is further based upon on a genre of each of the plurality of different video games.

15. The system of claim 12, wherein each of the plurality of different video games belong to a different genre.

16. The system of claim 12, wherein the normalization process comprises assessing the value of each of the virtual items based, at least in part, on its rarity.

17. The system of claim 12, wherein the normalization process comprises assessing the value of each virtual item based, at least in part, on the percentage of users who have the virtual item.

18. The system of claim 12, wherein the normalization process comprises assessing the value of each virtual item based, at least in part, on the cost of purchasing the virtual item.

19. The system of claim 12, wherein the normalization process comprises assessing the value of each virtual item based, at least in part, on the level at which the virtual item is available for purchase or as the reward to the player.

20. The system of claim 12, further comprising a recommendation module configured to recommend the virtual item for trade based on the value of the virtual item.

\* \* \* \* \*